United States Patent
Li et al.

(10) Patent No.: US 11,080,838 B1
(45) Date of Patent: Aug. 3, 2021

(54) SYSTEMS AND METHODS FOR IMAGE LABELING USING ARTIFICIAL INTELLIGENCE

(71) Applicant: State Farm Mutual Automobile Insurance Company, Bloomington, IL (US)

(72) Inventors: Yuntao Li, Champaign, IL (US); Charlie Isaksson, Plano, TX (US); Marigona Bokshi-Drotar, Redmond, WA (US); Jing Wan, Allen, TX (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 108 days.

(21) Appl. No.: 16/535,322

(22) Filed: Aug. 8, 2019

Related U.S. Application Data

(60) Provisional application No. 62/718,210, filed on Aug. 13, 2018, provisional application No. 62/741,923, filed on Oct. 5, 2018.

(51) Int. Cl.
*G06T 7/00* (2017.01)
*G06K 9/00* (2006.01)

(52) U.S. Cl.
CPC ........ *G06T 7/0002* (2013.01); *G06K 9/00637* (2013.01); *G06T 2207/20081* (2013.01); *G06T 2207/30184* (2013.01)

(58) Field of Classification Search
CPC ......... G06T 7/0002; G06T 2207/20081; G06T 2207/30184; G06K 9/00637
See application file for complete search history.

(56) References Cited

U.S. PATENT DOCUMENTS

| | | | |
|---|---|---|---|
| 8,510,196 B1 | 8/2013 | Brandmaier | |
| 9,159,132 B1 | 10/2015 | Crowsey | |
| 10,102,428 B2 | 10/2018 | Loveland | |
| 2003/0218776 A1 | 11/2003 | Morimoto | |
| 2009/0265193 A1 | 10/2009 | Collins | |
| 2015/0348204 A1 | 12/2015 | Daues | |
| 2017/0053169 A1* | 2/2017 | Cuban et al. | G06K 9/00664 |
| 2017/0249510 A1 | 8/2017 | Labrie | |
| 2017/0352100 A1* | 12/2017 | Shreve et al. | G06K 9/4633 |
| 2018/0247416 A1* | 2/2018 | Ruda et al. | G06K 9/00637 |
| 2018/0189749 A1 | 7/2018 | Takamori | |
| 2018/0247121 A1* | 8/2018 | Loveland et al. | |
| 2018/0292328 A1 | 10/2018 | Karube | |

* cited by examiner

*Primary Examiner* — Siamak Harandi
(74) *Attorney, Agent, or Firm* — Armstrong Teasdale LLP

(57) ABSTRACT

An image analysis ("IA") computer system for analyzing images of hail damage includes at least one processor in communication with at least one memory device. The at least one processor is programmed to: (i) store a damage prediction model associated with a rooftop, wherein the damage prediction model utilizes an artificial intelligence algorithm; (ii) display, to a user, an image of a rooftop; (iii) receive, from the user, a request to analyze damage to the rooftop; (iv) apply, by the at least one processor, the damage prediction model to the image, the damage prediction model outputting a plurality of damage prediction locations of the rooftop in relation to the image; and/or (v) display, by the at least one processor, an overlay box at each of the plurality of damage prediction locations, the overlay box being a virtual object overlaid onto the image for labeling the damage prediction locations.

20 Claims, 14 Drawing Sheets

SYSTEMS AND METHODS FOR IMAGE LABELING USING ARTIFICIAL INTELLIGENCE

CROSS-REFERENCE TO RELATED APPLICATIONS

This application claims the benefit of priority to U.S. Provisional Patent Application No. 62/718,210, filed Aug. 13, 2018, entitled "SYSTEMS AND METHODS FOR IMAGE LABELING USING ARTIFICIAL INTELLIGENCE," and to U.S. Provisional Patent Application No. 62/741,923, filed Oct. 5, 2018, entitled "SYSTEMS AND METHODS FOR IMAGE LABELING USING ARTIFICIAL INTELLIGENCE," the entire contents and disclosures of which are hereby incorporated herein by reference in their entirety.

FIELD OF THE INVENTION

The present disclosure relates to image labeling, and, more specifically, to network-based methods and systems for image labeling damaged region using artificial intelligence including identifying and labeling damaged regions of an object included within a computer generated image.

BACKGROUND

In the insurance industry, it is common to insure structures (e.g., homes, automobiles, etc.) against damage, such as, for example, damage caused by thunderstorms, tornadoes, hurricanes, fires, and floods. In the case of storm damage, structures (e.g., rooftops) in the path of the storm may be damaged by, for example, wind and/or hailstones (e.g., hail) generated by the storm. Where a storm spans a large area or deposits, for example, hailstones over a densely populated region, the number of claims made as a consequence of the storm may escalate rapidly. In these cases where storms impact a large densely populated area, policyholders may face increased claim processing times due to the volume of claims being made by policyholders. In order to process these claims, insurance providers may need to dispatch a claims adjuster to an insured property to collect data as to the damaged structure.

Conventional techniques employed by insurance providers include employing human domain experts to analyze and label the collected data. This can be time-sensitive, manually-intensive, and inefficient when it comes to analyzing large volume of data for claims processing. Although some advanced analytics and intelligent decision-making techniques are available, these techniques often yield unreliable and inconsistent outputs that result in more work for human domain experts.

BRIEF SUMMARY

The present embodiments may relate to systems and methods for analyzing images of hail damage to an object, such as a rooftop, to identify and label areas of said hail damage. An image analysis ("IA") computer system, as described herein, may include an image analysis ("IA") server in communication with one or more user computing devices, one or more insurer network computing devices, and an image capturing device, such as a drone. The IA computer system may be programmed to: (i) store a damage prediction model associated with a rooftop, wherein the damage prediction model utilizes an artificial intelligence algorithm including machine learning techniques for analyzing rooftops and identifying damage thereto; (ii) display, to a user, an image of a rooftop; (iii) receive, from the user, a request to analyze damage to the rooftop; (iv) apply, by the at least one processor, the damage prediction model to the image, the damage prediction model outputting a plurality of damage prediction locations of the rooftop in relation to the image; and/or (v) display, by the at least one processor, an overlay box at each of the plurality of damage prediction locations, the overlay box being a virtual object overlaid onto the image for labeling the damage prediction locations.

In one aspect, an image analysis ("IA") computer system for analyzing images of hail damage may be provided. In some exemplary embodiments, the IA computer system may include an image analysis ("IA") server that includes at least one processor in communication with at least one memory device. The at least one processor may be programmed to: (i) store, in the at least one memory device, a damage prediction model associated with a rooftop, wherein the damage prediction model utilizes an artificial intelligence algorithm, including machine learning techniques for analyzing rooftops and identifying damage thereto; (ii) display, to a user, an image of a rooftop; (iii) receive, from the user, a request to analyze damage to the rooftop; (iv) apply, by the at least one processor, the image to the damage prediction model, the damage prediction model outputting a plurality of damage prediction locations of the rooftop in relation to the image; and/or (v) display, by the at least one processor, an overlay box at each of the plurality of damage prediction locations, the overlay box being a virtual object overlaid onto the image. The computer system may include additional, less, or alternate functionality, including that discussed elsewhere herein.

In another aspect, a computer-implemented method for analyzing images of hail damage using artificial intelligence may be provided. The method may be implemented using an image analysis ("IA") computer system. The IA computer system may include at least one processor in communication with at least one memory device. The method may include: (i) storing, in the at least one memory device, a damage prediction model associated with a rooftop, wherein the damage prediction model implements an artificial intelligence algorithm, including machine learning techniques for analyzing rooftops and identifying damage thereto; (ii) displaying, to a user, an image of a rooftop; (iii) receiving, from the user, a request to analyze damage to the rooftop; (iv) applying, by the at least one processor, the image to the damage prediction model, the damage prediction model outputting a plurality of damage prediction locations of the rooftop in relation to the image; and/or (v) displaying, by the at least one processor, an overlay box at each of the plurality of damage prediction locations, the overlay box being a virtual object overlaid onto the image. The method may include additional, less, or alternate functionality, including those discussed elsewhere herein.

In a further aspect, at least one non-transitory computer-readable storage media having computer-executable instructions embodied thereon may be provided. When executed by at least one processor, the computer-executable instructions may cause the at least one processor to: (i) store a damage prediction model associated with a rooftop, wherein the damage prediction model utilizes an artificial intelligence algorithm, including machine learning techniques for analyzing rooftops and identifying damage thereto; (ii) display, to a user, an image of a rooftop; (iii) receive, from the user, a request to analyze damage to the rooftop; (iv) apply, by the at least one processor, the image to the damage prediction model, the damage prediction model outputting a plurality of damage prediction locations of the rooftop in relation to the image; and/or (v) display, by the at least one processor, an overlay box at each of the plurality of damage prediction locations, the overlay box being a virtual object overlaid onto the image.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
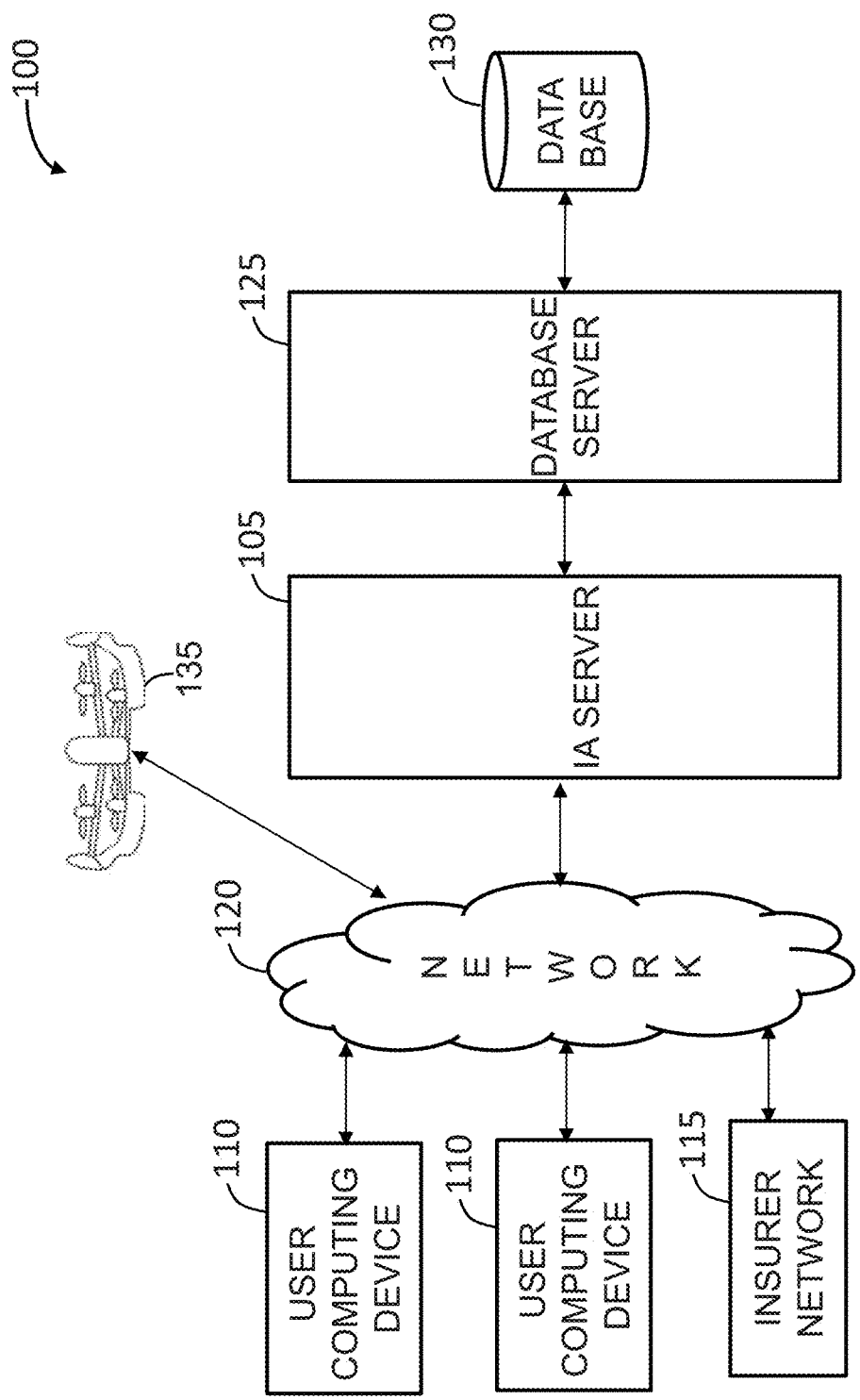
FIG. 1 illustrates a schematic diagram of an exemplary image analysis (IA) computer system for hail damage verification using artificial intelligence and machine learning techniques.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, improved systems and methods for hail damage verification and/or hail detection. The systems and methods described herein overcome the deficiencies of other known systems. In one exemplary embodiment, the process may be performed by an image analysis ("IA") server. In another exemplary embodiment, the process may be performed by at least one frontend system, such as a user computing device, and/or at least one backend system, such as the IA server. In the exemplary embodiment, the IA server may be a web server that may be in communication with at least one user computing device, an insurer network, and/or an image capturing device (e.g., a drone, satellite, air plane, or other device for capturing images).

In the exemplary embodiment, the IA server may enable a user (e.g., a human data labeler, domain expert, data analyst, insurance claims assessor, artificial intelligence (AI) supervisor, and/or administrator of an organization) to efficiently examine large volumes of image data to accurately identify damaged regions. Image data may be obtained by an image capture device, such as a drone or other device for capturing images. For example, instead of dispatching a claims adjuster to investigate a policyholder's property, an insurance provider may deploy a drone capable of flight to obtain image data associated with the damaged property (e.g., structure). The drone may be in communication with the IA server. In some embodiments, the drone may periodically transmit collected image data to the IA server for analysis. In other embodiments, the collected image data may be automatically transmitted to the IA server. The IA server may store the received image data in a database. The received image data may be linked to a corresponding claim number in the database to facilitate a subsequent image retrieval and recordkeeping process.

In the exemplary embodiment, the IA server provides access to a web portal that enables a user to examine images (e.g., image data). Each user is enrolled with the IA server such that only enrolled (e.g., registered) users may access images stored in the IA server's database. Registered users are provided with login credentials (e.g., a username and a password). A user enters their login information into the web portal, which is transmitted (e.g., in the form of a user login input) to the IA server. The IA server stores login information in a login information database such that the IA server receives a user login input corresponding to a user and grants the user access to the web portal. The IA server may compare that user login information (e.g., user login input) to a list of login information and authenticate the user as a registered user.

In the exemplary embodiment, the IA server may subsequently use the user login input to retrieve image data selected by the IA server for the user. For example, the IA server may host a website and/or otherwise provide instructions to the user's user computing device, which causes the user computing device to display a specific image for analysis. The IA server may distribute images for review to users intelligently, such that a high performing data labeler will either examine more images (e.g., user gets more image data) or examine lower quality images. Images may be assigned in a manner that maximizes overall efficiency, where more images are correctly analyzed and reviewed in a short amount of time. In the exemplary embodiment, upon logging into the web portal, the user views the original raw image, and subsequently transmits, to the IA server, a request to analyze damaged regions to the object (e.g., rooftop) identified in the image. For example, the user may select a "run model" button to transmit the request to the IA server.

The IA server may implement at least one damage prediction model associated with the object to be analyzed. In the exemplary embodiment, the IA server stores at least one damage prediction model associated with a rooftop. The model may implement an artificial intelligence algorithm, such as a machine learning algorithm. For example, a deep learning algorithm may be applied to a rooftop image captured by a drone to predict damaged regions to the rooftop. The damage prediction model may use artificial neural networks (e.g., neural network), such as multi-layer deep neural networks. In some embodiments, the damage prediction model may be trained using sets of sample image data (e.g., training sets) that are correctly labeled to identify objects portrayed in the image data. For example, the sample image data may be used to train the damage prediction model to recognize various types of rooftop types (e.g., gable roof, flat roof, and hip roof), rooftops materials (e.g., asphalt shingles, metal, slate, tile, and wood), and rooftop slopes (e.g., flat, low, and steep slopes). Additionally or alternatively, the sample image data may be used to train the damage prediction model to recognize and distinguish between different types of rooftop damages (e.g., hail damage, water damage, wind damage, storm damage, structural damage due to fallen trees, damage due to wildlife, and intentional man-made mechanical damage). For example, the damage prediction model may be trained to recognize various patterns of rooftop damage associated with each type of rooftop damage (e.g., repetitive dents in an isolated area of a rooftop, cracked/torn/chipped tiles throughout the rooftop, damaged fascia boards, missing shingles, bruised shingles, discoloration, and holes in the rooftop). In further embodiments, the IA server may implement one or more sets of test image data (e.g., validation image data) to evaluate how accurately the damage prediction model learned to classify rooftop images. In the exemplary embodiment, the model may primarily be focused on pattern recognition, and may be trained to recognize, for example, hail damaged regions of rooftops, by inputting image training data sets of example images of rooftop hail damage into the model. In further embodiments, the training image data and/or test image data may be pre-processed and split into a number of datasets to train the neural networks and build the damage prediction model.

In the exemplary embodiment, historical image data may also be used to enable the model to accurately predict the correct output. More specifically, labeled image data (e.g., damage prediction outputs that have been verified and/or corrected by a human data labeler) may feed back into the model in real-time or with near real-time latencies (e.g., on the order of 10 milliseconds or less) along with other inputs to continuously update the model's parameters in a dynamic process. In one embodiment, labeled image data automatically feeds back into the model each time the user submits the labeled image data to the IA server. In other embodiments, labeled image data of an image or a group of images may feed back into the model after an administrator or supervisor has reviewed and/or approved the labeled image data.

In some embodiments, more than one damage prediction model is available. In these embodiments, the IA server may determine which model (or combination of models) to apply based upon on the damage classification selected by the user. The damage classification may be one of hail damage, wind damage, flood damage, fire damage, and/or mechanical damage. For example, if the user submits a request to analyze damaged regions due to heavy rain, the IA server may apply a damage prediction model that is trained to recognize rooftop damage due to heavy rain as opposed to rooftop damage due to mechanical artifacts (e.g., man-made damage).

In the exemplary embodiment, a damage prediction model is applied to an image of a rooftop to predict damage regions on a rooftop due to hail. After the damage prediction model has been applied to the image, the IA server displays the model's prediction outputs (e.g., damage prediction regions) to the user for review. More specifically, the IA server may display a model prediction image, where the original image is superimposed with virtual objects (e.g., label overlays) at each damage prediction region (e.g., damage prediction location). In the exemplary embodiment, virtual objects, such as interactive overlay boxes and/or labels, are provided by the IA server at each damage prediction region on the original image. Thus, a user is able to automatically view all the damage prediction regions on the original image, and subsequently select each virtual object to review the model's predictions.

In the exemplary embodiment, when a user selects a virtual object, the IA server automatically displays a magnified view of the corresponding damage prediction region in a separate zoom-in section of the user's interface. The user may utilize the zoom-in section to confirm or correct (e.g., modify) each of the model's prediction outputs. To correct a damage prediction region, the user may utilize the zoom-in section to add virtual objects, labels, and/or annotations to the model prediction image.

After reviewing each damage prediction region, the user may submit their results to the IA server. For example, if the model correctly predicted a particular damage prediction region, and there is no need to modify the prediction output, the user may click a "submit" button to submit the unmodified prediction to the IA server as their "result." If instead, the prediction output is incorrect, and the user, for example, added virtual objects and annotations to correctly identify an actual damaged region, the modified prediction is the "result" that is submitted to the IA server. After reviewing and submitting results for each prediction output, the user may transmit another image request to the IA server, and repeat the above-described process for the new image.

In the exemplary embodiment, the submitted results are cycled back into the damage prediction model in real-time to update the model for application to subsequent images. The IA server may also monitor a user's work performance in real-time to collect performance data. The performance data may be used by the IA server to select the next image to be displayed to the user. The performance data may also be used to rank users and evaluate a user based upon factors, such as speed, accuracy, and/or labeling consistency. In the exemplary embodiment, the submitted results are stored in the IA server's database.

In some embodiments, the submitted results are associated with a claim identifier, and linked to other data (e.g., image data) associated with the same claim identifier. In some embodiments, the database may include data associated with (i) the original raw image, (ii) the model prediction image (e.g., model outputs superimposed on the original image), and (iii) the labeled image (e.g., the results submitted by a user, such as a data labeler). In other embodiments, the submitted results are transmitted to insurer provider computing devices, and used to determine whether a damaged structure is covered under a policyholder's insurance policy, and/or to determine whether a claims adjuster needs to be dispatched to the insured property.

At least one of the technical problems addressed by this system includes automating an image labeling process that was previously, from start to finish, performed by hand. More specifically, the systems, methods, and computer-readable media described herein provide an efficient and reliable image labeling process that utilizes artificial intelligence techniques to build a damage prediction model, to generate prediction outputs of the damage prediction model, to display prediction outputs as label overlays (e.g., interactive virtual objects) on an original image, to enable a user to modify and/or confirm prediction outputs by interacting with each label overlay, to update the model with the modified prediction outputs, and to store the prediction outputs and modified prediction outputs with the images.

Exemplary technical effects of the systems, methods, and computer-readable media described herein may include, for example: (i) improved ability of data labelers to accurately process and label a large volume of image data; (ii) reduced time and effort required to correctly labeling a large volume of image data; (iii) improved speed in generating, processing, and/or issuing claims and/or claim disbursements after an insurance claim event; (iv) improved efficiency and accuracy in assessing property damage by applying a prediction model on captured images of insured structures before review and labeled by a data labeler; (v) improved ability of data labelers to track and monitor their own progress in real-time by utilizing the virtual objects overlaid onto the original image, and/or (vi) improved accuracy of data used to output predictions by continuously updating the prediction model with data reviewed and labeled by a data labeler.

The methods and systems described herein may be implemented using computer programming or engineering techniques including computer software, firmware, hardware, or any combination or subset thereof, wherein the technical effects may be achieved by performing at least one of the following: (a) storing a damage prediction model associated with a rooftop, wherein the damage prediction model utilizes an artificial intelligence algorithm, including machine learning techniques for analyzing rooftops and identifying damage thereto; (b) displaying, to a user, an image of a rooftop; (c) receiving, from the user, a request to analyze damage to the rooftop; (d) applying, by the at least one processor, the image to the damage prediction model, the damage prediction model outputting a plurality of damage prediction locations of the rooftop in relation to the image; and/or (e) displaying, by the at least one processor, an overlay box at each of the plurality of damage prediction locations, the overlay box being a virtual object overlaid onto the image.

Exemplary System for Labeling a Rooftop Image

FIG. 1 depicts a view of an exemplary embodiment of an image analysis (IA) computer system 100 for hail damage prediction and verification using artificial intelligence and machine learning techniques. IA computer system 100 includes computing devices that are capable of implementing process 400 shown in FIG. 4. In the exemplary embodiment, IA computer system 100 includes an image analysis (IA) server 105, and may be used for enabling a human data labeler and/or an insurance claims assessor to review and verify damaged regions predicted by IA computer system 100.

As described below in more detail, IA server 105 is a non-conventional computing device configured to at least: (i) store, in at least one memory device, a damage prediction model associated with a rooftop, wherein the damage prediction model utilizes an artificial intelligence algorithm, including machine learning techniques for analyzing rooftops and identifying damage thereto; (ii) display, to a user, an image of a rooftop; (iii) receive, from the user, a request to analyze damage to the rooftop; (iv) apply, by at least one processor, the image to the damage prediction model, the damage prediction model outputting a plurality of damage prediction locations of the rooftop in relation to the image; and/or (v) display, by the at least one processor, an overlay box at each of the plurality of damage prediction locations, the overlay box being a virtual object overlaid onto the image.

In the exemplary embodiment, IA computer system 100 includes at least one user computing device, such as user computing devices 110. User computing devices 110 may be associated with users, such as human data labelers, artificial intelligence (AI) supervisors (e.g., individuals who double checks the outputs of an AI model), and/or data analysts. In addition to IA server 105 and user computing devices 110, IA computer system 100 may also include an insurer network 115, a network 120, a database server 125, a database 130, and an image capture device, such as a drone 135 capable of flight or a land-based rover (not shown) and/or any other instrument, sensor, and/or device capable of capturing one or more images of a rooftop and/or capable of capturing, scanning, or otherwise obtaining rooftop data, such as image data and/or any other data representative of and/or including dimensional and/or geometric data associated with one or more impact craters on a rooftop. For example, in some embodiments, one or more rooftop mounted sensors, such as a plurality of laser level sensors included in a rooftop mounted laser-level system, may be used to collect rooftop data. Similarly, in other embodiments, one or more range detection systems, such as one or more radar systems, sonar systems, LIDAR systems, and the like may be used to collect rooftop data.

Accordingly, in the exemplary embodiment, user computing devices 110 are computers that include a web browser or a software application, which enables user computing devices 110 to access remote servers, such as IA server 105 and insurer network 115 computing devices, using network 120, the Internet, or other network. More specifically, user computing devices 110 may be communicatively coupled to the Internet through many interfaces including, but not limited to, at least one of a network, such as the Internet, a local area network (LAN), a wide area network (WAN), or an integrated services digital network (ISDN), a dial-upconnection, a digital subscriber line (DSL), a cellular phone connection, and a cable modem.

User computing devices 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. User computing devices 110 may be any personal computing device and/or any mobile communications device of a user, such as a personal computer, a tablet computer, a smartphone, and the like. User computing devices 110 may be configured to present an application (e.g., a smartphone "app") or a webpage, such as a webpage or an app for processing or viewing images associated with an insurance claim (e.g., roof insurance claims). To this end, user computing devices 110 may include or execute software, such as a web browser, for viewing and interacting with a webpage and/or an app. Although two user computing devices 110 are shown in FIG. 1 for clarity, it should be understood that IA computer system 100 may include any number of user computing devices 110.

Insurer network 115 computing devices include one or more computing devices associated with an insurance provider. In the exemplary embodiment, the insurance provider is associated with a policyholder who has filed a claim with the insurance provider for roof damage under their home insurance policy (e.g., homeowner's insurance). In the exemplary embodiment, insurance network 115 computing devices include a web browser or a software application, which enables insurance network 115 computing devices to access remote servers, such as IA server 105 and database server 125, using network 120.

More specifically, insurance network 115 computing devices may be communicatively coupled to network 120 through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Insurance network 115 computing devices may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, insurance network 115 computing devices may access database 130 to review image data (e.g., unlabeled original images and/or labeled images) associated with a policyholder's insurance claim to assess the extent of damage to the property and/or to determine whether a claims inspector needs to be sent to the premises to inspect the damage in person.

Network 120 may be any electronic communications system, such as any computer network or collection of computer networks, and may incorporate various hardware and/or software. Communication over network 120 may be accomplished via wired communication, or wireless communication or data transmission over one or more radio frequency links or communication channels. For instance, communication over network 120 may be accomplished via any suitable communication channels, such as, for example, one or more telephone networks, one or more extranets, one or more intranets, the Internet, one or more point of interaction devices (e.g., one or more interaction devices, smart phones or mobile devices, cellular phones), various online and/or offline communications systems, such as various local area and wide area networks, and the like.

IA server 105 is configured to communicate with a user computing device 110 associated with a user (not shown). User computing device 110 may be a web server, such as a computer or computer system that is configured to receive and process requests made via HTTP. In some embodiments, IA server 105 is also configured to receive and process requests made via HTTPS. IA server 105 may be coupled between user computing devices 110 and database server 125. More particularly, IA server 105 may be communicatively coupled to user computing devices 110 via network 120.

In various embodiments, IA server 105 may be directly coupled to database server 125 and/or communicatively coupled to database server 125 via a network, such as network 120. IA server 105 may, in addition, function to store, process, and/or deliver one or more web pages and/or any other suitable content to user computing devices 110. IA server 105 may, in addition, receive data, such as data provided to the app and/or webpage (as described herein) from user computing devices 110 for subsequent transmission to database server 125.

In some embodiments, IA server 105 may be associated with, or is part of a computer network associated with an insurance provider, or in communication with insurer network 115 computing devices. In other embodiments, IA server 105 may be associated with a third party and is merely in communication with insurer network 115 computing devices.

In various embodiments, IA server 105 may implement various hardware and/or software, such as, for example, one or more communication protocols, one or more message brokers, one or more data processing engines, one or more servlets, one or more application servers, and the like. For instance, in one embodiment, IA server 105 may implement an Internet of Things (IoT) protocol, such as a machine-to-machine IoT communications protocol (e.g., an MQTT protocol). In addition, in various embodiments, IA server 105 may implement a message broker program module configured to translate a message or communications from a messaging protocol of a sending device to a messaging protocol of a receiving device (e.g., RABBITTMQ, KAFKA, ACTIVEMQ, KESTREL) Further still, in some embodiments, IA server 105 may implement a data processing engine, such as a cluster computing framework like APACHE SPARK. In addition, in various embodiments, IA server 105 may implement servlet and/or JSP server, such as APACHE TOMCAT.

Database server 125 may be any computer or computer program that provides database services to one or more other computers or computer programs. In various embodiments, database server 125 may be communicatively coupled between web server 125 and database 130. Database server 125 may, in addition, function to process data received from IA server 105.

Database 130 may be any organized collection of data, such as, for example, any data organized as part of a relational data structure, any data organized as part of a flat file, and the like. Database 130 may be communicatively coupled to database server 125 and may receive data from, and provide data to, database server 125, such as in response to one or more requests for data, which may be provided via a database management system (DBMS) implemented on database server 125, such as SQLite, PostgreSQL (e.g., Postgres), or MySQL DBMS. Database 130 may be a scalable storage system that includes fault tolerance and fault compensation capabilities. Data security capabilities may also be integrated into database 130.

In one embodiment, database 130 may be Hadoop Distributed File System (HDFS). In other embodiments, database 130 may be a non-relational database, such as APACHE Hadoop® database.

In the exemplary embodiment, database 130 may include a large amount of raw image data (e.g., original image data), model prediction data (e.g., prediction outputs of the damage prediction model), labeled image data where prediction outputs of a raw image data have been analyzed by a labeler, training image data associated with training new users as to labeling image data, and various damage prediction models based upon the type of damage to be assessed (e.g., hail damage, wind damage, flood damage, and/or artificial damage caused by a person) and the object of damage (e.g., home roofs, car hoods). In the exemplary embodiment, database 130 may be stored remotely from IA server 105.

In some embodiments, database 130 may be decentralized. In the exemplary embodiment, a labeler and/or administrator may access database 130 via user computing devices 110 by logging onto IA server 105, as described herein. In other embodiments, a claims adjuster may also access database 130 via insurer network 115 computing devices by logging onto IA server 105.

Drone 135 may be any device capable of capturing an image of a rooftop. For example, drone 135 may be an automated and/or remote controlled device capable of capturing one or more aerial images of one or more rooftops. To this end, drone 135 may include an image capture device, such as a camera. Drone 135 may, in addition, include a radio transmitter and/or receiver for receiving one or more instructions (such as a navigation instruction and/or an instruction relating to an area to photograph). The radio transmitter/receiver may also transmit one or more captured images, such as by way of network 120, to user computing devices 110, IA server 105, database server 125, and/or database 130. Thus, drone 135 may be used to acquire one or more images of one or more rooftops for analysis and evaluation, as described herein. Additionally or alternatively, a remotely controlled or autonomous land-based rover equipped with a camera may acquire the rooftop images.

In the example embodiment, each user computing device 110 includes a user interface (not shown). For example, the user interface may include a graphical user interface with interactive functionality, such that raw image data, transmitted from IA server 105 to user computing device 110, may be displayed in an editable format. User computing device 110 is unconventional in that it is able to perform the unique steps described herein. A user of user computing device 110 may interact with the user interface to view, explore, and otherwise interact with the web portal (e.g., loading raw images, applying a damage prediction model to the loaded image, viewing each damage prediction region, and/or labeling actual damaged regions of the image). In the example embodiment, the web portal is hosted by or stored on IA server 105 and accessed by user computing device 110. For example, the web portal may be stored on and executed by IA server 105.

User computing device 110 may provide inputs to the web portal. The inputs are received by IA server 105 via network 120 which are used by IA server 105 to execute functions as described above. The web portal may further provide outputs to user computing device 110. The web portal may be a website (e.g., hosted by IA server 105), application, or other tool.

In further embodiments, the user may access the web portal hosted by IA server 105 to, among other things, request to analyze an image, apply a damage prediction model to the image, view damage predictions outputted by the model (e.g., virtual objects are overlaid on damage prediction regions of the image), interact with each damage prediction region to verify whether or not each damage prediction region contains actual damage, label actual damaged regions on the image, provide annotations and comments for a specific damaged region and/or the analyzed image (as a whole), and submit the analyzed image to IA server 105. In additional embodiments, an administrator may access the web portal hosted by IA server 105 to, among other things, review the image data associated with analyzed images, track the performance of data labelers (e.g., on an individual basis as well as a group), compare the performance of each data labeler with one another, access training exercises and training image data for new and/or inexperienced data labelers, and view progress reports associated with the analyzed image data.

Although the components of system 100 are described below and depicted at FIG. 1 as being interconnected in a particular configuration, it is contemplated that the systems, subsystems, hardware and software components, various network components, and database systems described herein may be variously configured and interconnected and may communicate with one another within IA computer system 100 to facilitate the processes and advantages described herein. For example, although a single insurer network 115, a single network 120, a single database server 125, a single database 130, and a single drone 135 are described above, it will be appreciated that system 100 may include any suitable number of interconnected, communicatively coupled, user computing devices, networks, servers, databases, and/or drones. Further, although certain functions, processes, and operations are described herein with respect to one or more system components, it is contemplated that one or more other system components may perform the functions, processes, and operations described herein.

Exemplary Client Device

Figure 2:
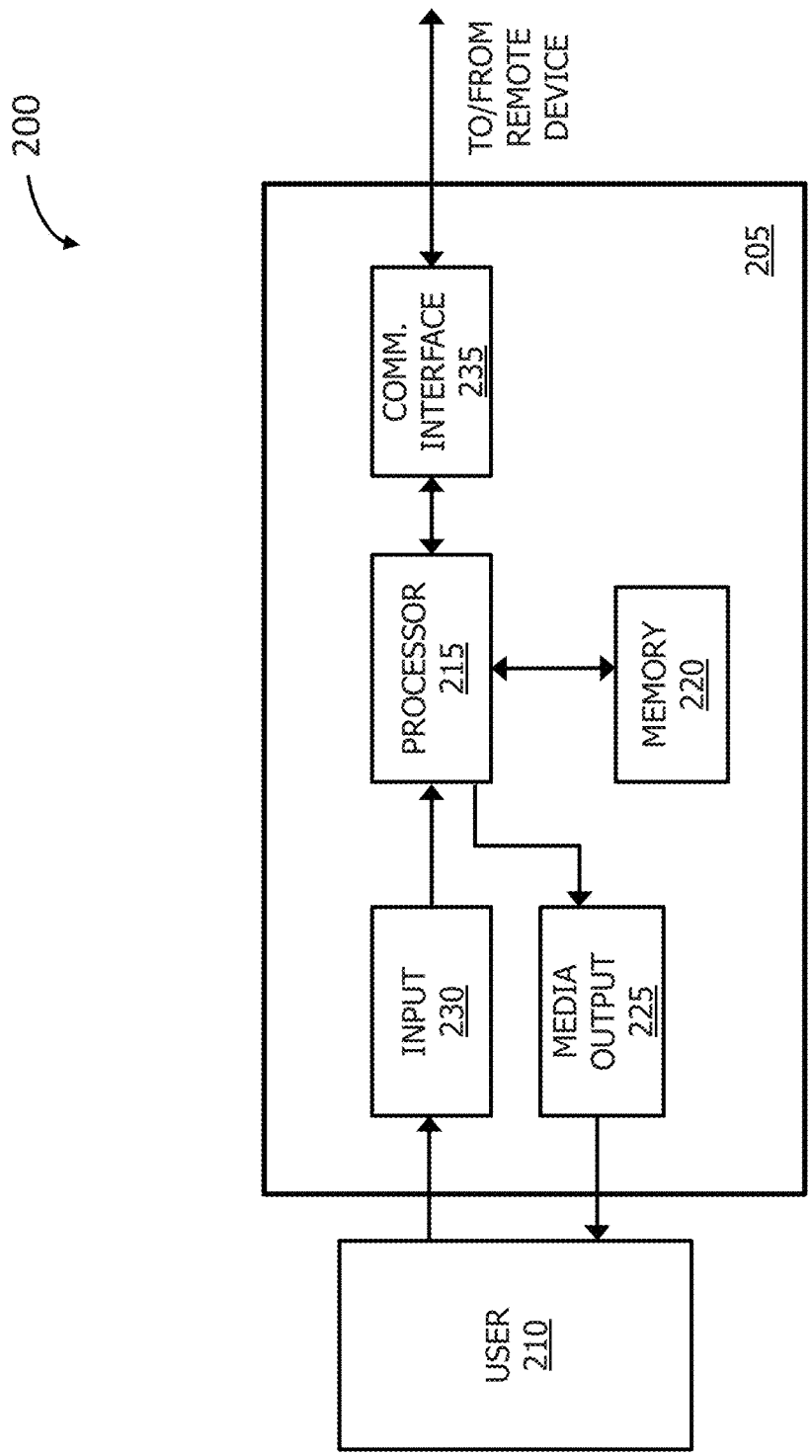
FIG. 2 illustrates an exemplary configuration of a user computing device shown in FIG. 1, in accordance with one embodiment of the present disclosure.

FIG. 2 depicts an exemplary configuration 200 of user computing device 205, in accordance with one embodiment of the present disclosure. In the exemplary embodiment, user computing device 205 may be similar to, or the same as, user computing devices 110 (shown in FIG. 1). User computing device 205 may be operated by a user 210. User computing device 205 may include, but is not limited to, user computing devices 110 and insurer network 115 computing devices (both shown in FIG. 1). User computing device 205 may include a processor 215 for executing instructions. In some embodiments, executable instructions may be stored in a memory area 220. Processor 215 may include one or more processing units (e.g., in a multi-core configuration).

Memory area 220 may be any device allowing information such as executable instructions and/or image data to be stored and retrieved. Memory area 220 may include one or more computer readable media.

User computing device 205 may also include at least one media output component 225 for presenting information to user 210. Media output component 225 may be any component capable of conveying information to user 210. In some embodiments, media output component 225 may include an output adapter (not shown) such as a video adapter and/or an audio adapter. An output adapter may be operatively coupled to processor 215 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 225 may be configured to present a graphical user interface (e.g., a web browser and/or a client application) to user 210. A graphical user interface may include, for example, a labeler user interface for logging into IA server 105, selecting and viewing raw images of damaged objects (e.g., roofs), applying a damage prediction model to a selected image, viewing results of the damage prediction model (e.g., viewing the damage prediction locations via the overlay boxes on the image), selecting a label (e.g., an overlay box) on the image to automatically zoom into the damage prediction location on the image, verifying whether the corresponding damage prediction location has actual physical damage due to the selected damage classification (e.g., damage due to hail, wind, flood), updating the prediction by labeling regions not identified and/or misidentified as damage locations, and submitting comments, for example as to image quality, with each image. The graphical user interface may also include, for example, an administrator user interface for viewing analytics associated with labeled image data, tracking and assessing the performance of each labeler, and training new labelers.

In some embodiments, user computing device 205 may include an input device 230 for receiving input from user 210. User 210 may use input device 230 to, without limitation, select an image to be analyzed, apply a damage prediction model to the image, label damage locations on the image, and/or enter one or more items of information about image quality, damage prediction locations and/or actual damage locations.

Input device 230 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 225 and input device 230.

User computing device 205 may also include a communication interface 235, communicatively coupled to a remote device such as IA server 105 (shown in FIG. 1). Communication interface 235 may include, for example, a wired or wireless network adapter and/or a wireless data transceiver for use with a mobile telecommunications network.

Stored in memory area 220 are, for example, computer readable instructions for providing a user interface to user 210 via media output component 225 and, optionally, receiving and processing input from input device 230. A user interface may include, among other possibilities, a web browser and/or a client application. Web browsers enable users, such as user 210, to display and interact with media and other information typically embedded on a web page or a website from IA server 105. An end user program, such as a client application may allow user 210 to interact with, for example, IA server 105. For example, instructions may be stored by a cloud service, and the output of the execution of the instructions sent to the media output component 225.

Processor 215 executes computer-executable instructions for implementing aspects of the disclosure. In some embodiments, processor 215 is transformed into a special purpose microprocessor by executing computer-executable instructions or by otherwise being programmed.

Exemplary Server Device

Figure 3:
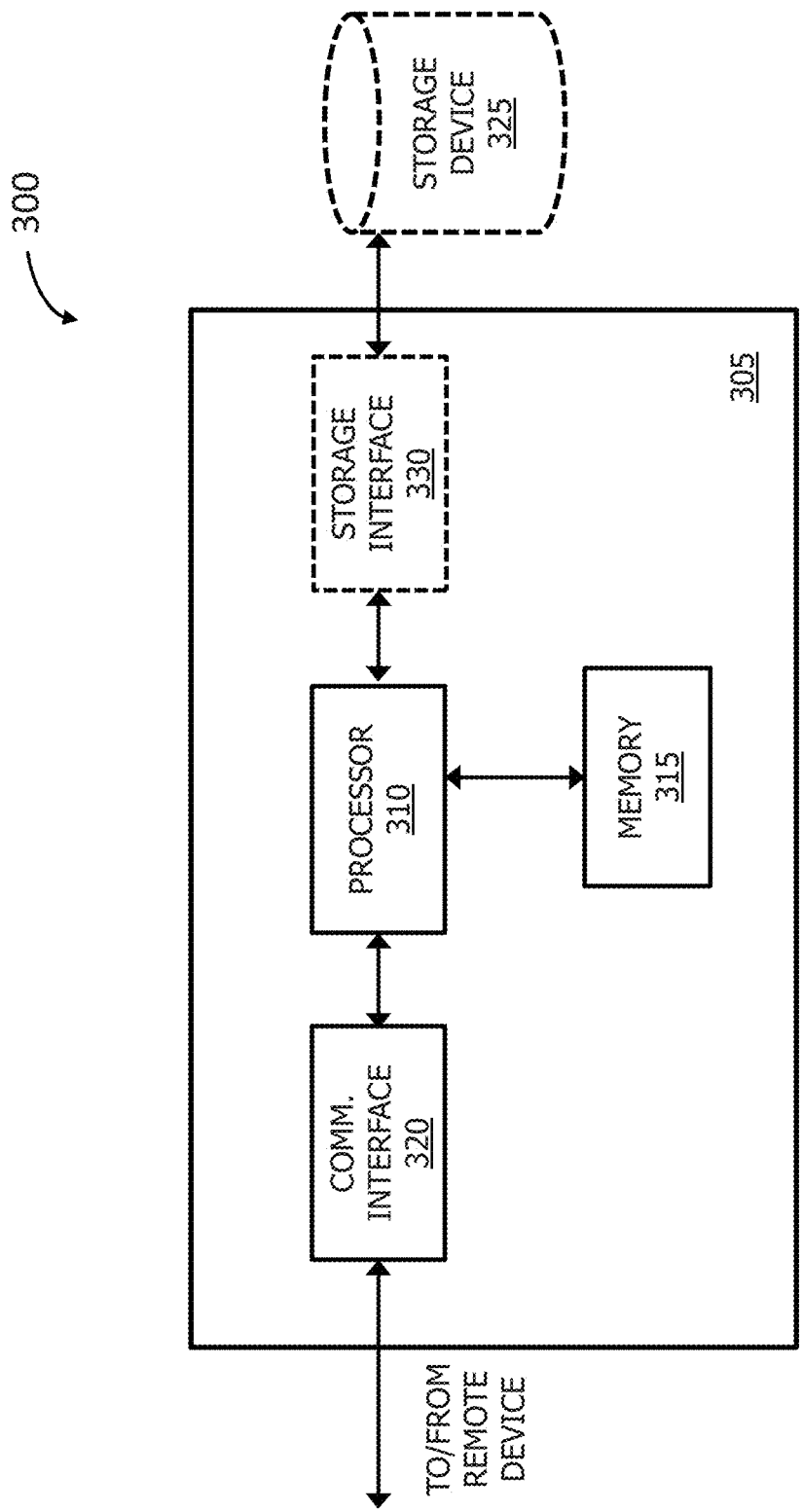
FIG. 3 illustrates an exemplary configuration of a server system shown in FIG. 1, in accordance with one embodiment of the present disclosure.

FIG. 3 depicts an exemplary configuration 300 of a server computing device 305, in accordance with one embodiment of the present disclosure. In the exemplary embodiment, server computing device 305 may be similar to, or the same as, IA server 105 (shown in FIG. 1). Server computing device 305 may include, but is not limited to, IA server 105, insurer network 115, database server 125, and database 130 (all shown in FIG. 1). Server computing device 305 may also include a processor 310 for executing instructions. Instructions may be stored in a memory area 315. Processor 310 may include one or more processing units (e.g., in a multi-core configuration). The instructions may be executed within a variety of different operating systems on server computing device 305, such as UNIX, LINUX, Microsoft Windows®, etc.

It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 310 may be operatively coupled to a communication interface 320 such that server computing device 305 is capable of communicating with a remote device such as another server computing device 305, IA server 105, insurance network 115 computing devices, user computing devices 110, (all shown in FIG. 1). For example, communication interface 320 may receive requests from user computing devices 110 via the Internet, as illustrated in FIG. 1.

Processor 310 may also be operatively coupled to a storage device 325. Storage device 325 may be any computer-operated hardware suitable for storing and/or retrieving data, such as, but not limited to, data associated with database 130 (shown in FIG. 1). In some embodiments, storage device 325 may be integrated in server computing device 305. For example, server computing device 305 may include one or more hard disk drives as storage device 325. In other embodiments, storage device 325 may be external to server computing device 305 and may be accessed by a plurality of server computing devices 305. For example, storage device 325 may include a storage area network (SAN), a network attached storage (NAS) system, and/or multiple storage units such as hard disks and/or solid state disks in a redundant array of inexpensive disks (RAID) configuration.

In some embodiments, processor 310 may be operatively coupled to storage device 325 via a storage interface 330. Storage interface 330 may be any component capable of providing processor 310 with access to storage device 325. Storage interface 330 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 310 with access to storage device 325.

Processor 310 may execute computer-executable instructions for implementing aspects of the disclosure. In some embodiments, the processor 310 may be transformed into a special purpose microprocessor by executing computer-executable instructions or by otherwise being programmed. For example, the processor 310 may be programmed with instructions, such as illustrated in FIG. 4.

Memory area 315 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Computer-Implemented Method for Labeling a Rooftop Image

Figure 4:
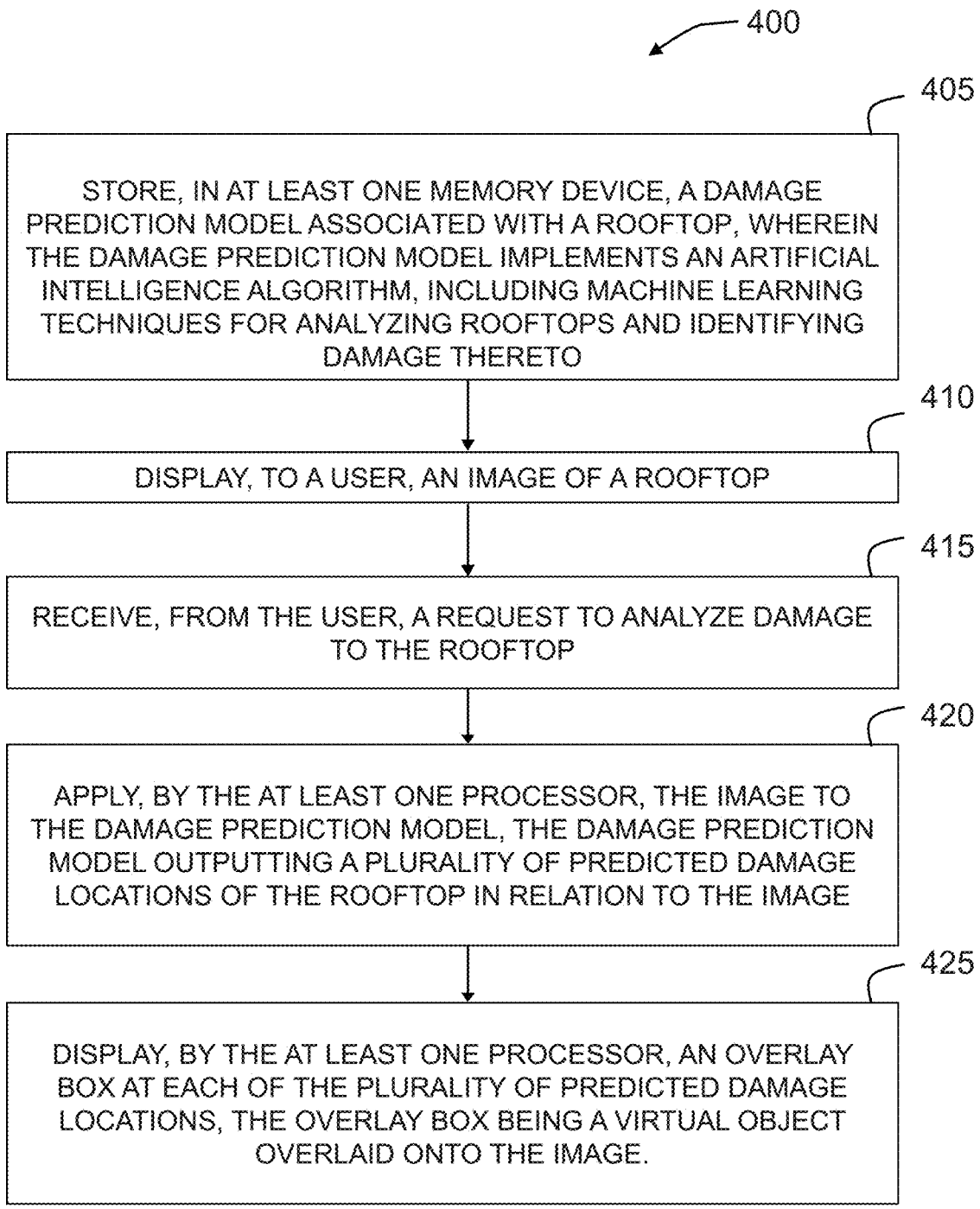
FIG. 4 illustrates a flowchart of an exemplary computer-implemented process implemented by the IA computer system shown in FIG. 1 for hail damage verification and identification.

FIG. 4 illustrates a flowchart of an exemplary computer-implemented process 400 implemented by IA computer system 100 (shown in FIG. 1) for detecting and verifying actual hail damage. Process 400 may be implemented by a computing device, for example IA computer system 100 (shown in FIG. 1). In the exemplary embodiment, IA computer system 100 includes IA server 105, user computing devices 110, insurer network 115 computing devices, drone 135, database server 125, and/or database 130 (all shown in FIG. 1).

In the exemplary embodiment, process 400 may include IA computer system 100 storing 405, in at least one memory device (e.g., database 130 and/or database server 125), a damage prediction model associated with a rooftop. The damage prediction model utilizes an artificial intelligence algorithm, including machine learning techniques for analyzing rooftops and identifying damage thereto. Process 400 may also include IA computer system 100 displaying 410, to a user, an image of a rooftop. The image may be received from drone 135 (or additionally or alternatively from a land-based robot remotely controlled or autonomous rover equipped with a camera) via network 120.

In addition, in some embodiments, the image may be received from any other suitable image capture device and/or sensor, such as, for example, by a handheld camera and/or, in some cases, by a satellite equipped with one or more image capture devices (e.g., a satellite orbiting the earth). Further, as described above, rooftop data, including image data, may be captured by any other suitable image capture device/sensor and/or data collection system, such as any range detection system (e.g., radar, sonar, and/or LIDAR system).

Process 400 may further include receiving 415, from the user, a request to analyze damage to the rooftop. For example, after logging into IA server 105, the user may select an image to be analyzed and subsequently click a "run model" or "analyze" button provided on the user interface. Process 400 may also include applying 420 the image to the damage prediction model after the IA computer system 100 receives the request from the user via the user's user computing device 110 (shown in FIG. 1). The damage prediction model subsequently outputs a plurality of damage prediction locations of the rooftop in relation to the image. Process 400 may further include displaying 425 an overlay box at each of the plurality of damage prediction locations. The overlay box is an interactive virtual object overlaid onto the image that enables the user to zoom into each damage prediction location, and determine whether the damage prediction location is an actual damage location (e.g., actual damage corresponding to the selected damage classification is present at an actual damage location).

Exemplary Computing Device

Figure 5:
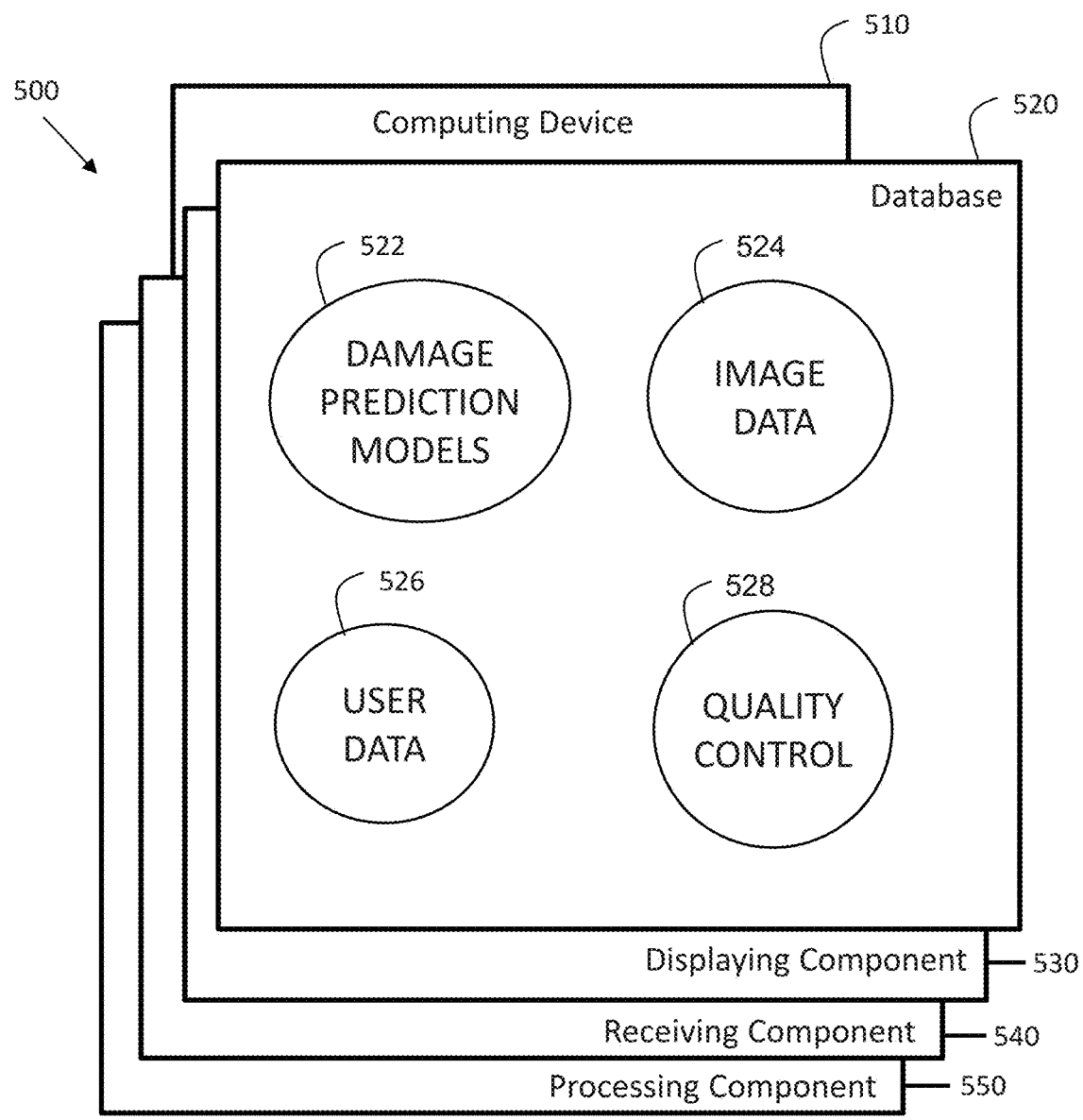
FIG. 5 illustrates a flow chart of an exemplary process of implementing the IA computer system to verify and/or modify damage prediction outputs in accordance with one aspect of the present disclosure.

FIG. 5 depicts a diagram 500 of components of one or more exemplary computing devices 510 that may be used in IA computer system 100 (shown in FIG. 1). In some embodiments, computing device 510 may be similar to IA server 105 (shown in FIG. 1). FIG. 5 further shows a configuration of data in database 520, which may be similar to database 130 (shown in FIG. 1), memory area 315 and/or storage device 325 (both shown in FIG. 3). Database 520 may include, for example, one or more damage prediction models 522, image data 524, user data 526, and quality control data 528. Database 520 may be coupled with several separate components within computing device 510, which perform specific tasks.

Damage prediction models 522 may include artificial intelligence and machine learning techniques as well as image training data sets and/or historical image data to which models 522 have been applied for updating models 522. Image data 524 may include raw image data (e.g., original image data), model prediction image data (e.g., data associated with raw images to which model 522 has been applied), and/or labeled image data (e.g., model prediction image data that has been reviewed and/or updated by a human data labeler). User data 526 may include performance data of each data labeler enrolled with IA server 105. Data labelers may be grouped according to, for example, a specific client a set of data labelers are registered under.

In these embodiments, a client identifier (e.g., claim identifier) may be associated with these data labelers to link data associated with these data labelers to the client in database 520. User data 526 may also include user login credentials and user labeling history (e.g., number of images examined, quality of the images examined, annotations and labels added for each image examined, time spent examining each image). Quality control data 528 may include data associated with quality control and management, including labeler training data (e.g., guided operational exercises, gold-standard example images), statistics based upon labeling data among users and/or for each user, full historical records for each examined image (e.g., raw image data that has been inputted into model 522 and evaluated by a human data labeler), and/or rankings and characteristics of each user in comparison with one another.

Computing device 510 may include a displaying component 530 configured to display, to a user, an image of an object, such as a rooftop to be analyzed (shown in FIG. 4). Displaying component 530 may also be configured to display an overlay box at each damage prediction location of an image (shown in FIG. 4). The overlay box may be a virtual object overlaid onto the image. Displaying component 530 causes a user device to display the appropriate image data. For example, display component 530 may transmit instructions to a user computing device (similar to user computing device 110, shown in FIG. 1) that cause the user computing device to display the example screenshots depicted in FIGS. 7-13 to the user.

Computing device 510 may further include a receiving component 540 configured to receive, from the user, a request to analyze damage to an object, such as a rooftop (shown in FIG. 4). Computing device 510 may also include a processing component 550 for applying the image to damage prediction model 522 (shown in FIG. 4). Processing component 550 may assist with outputting, from model 522, a plurality of damage prediction location of the rooftop in relation to the image (shown in FIG. 4). Processing component 550 may further assist with execution of computer-executable instructions associated with the system.

Exemplary Process for Labeling a Rooftop Image

Figure 6:
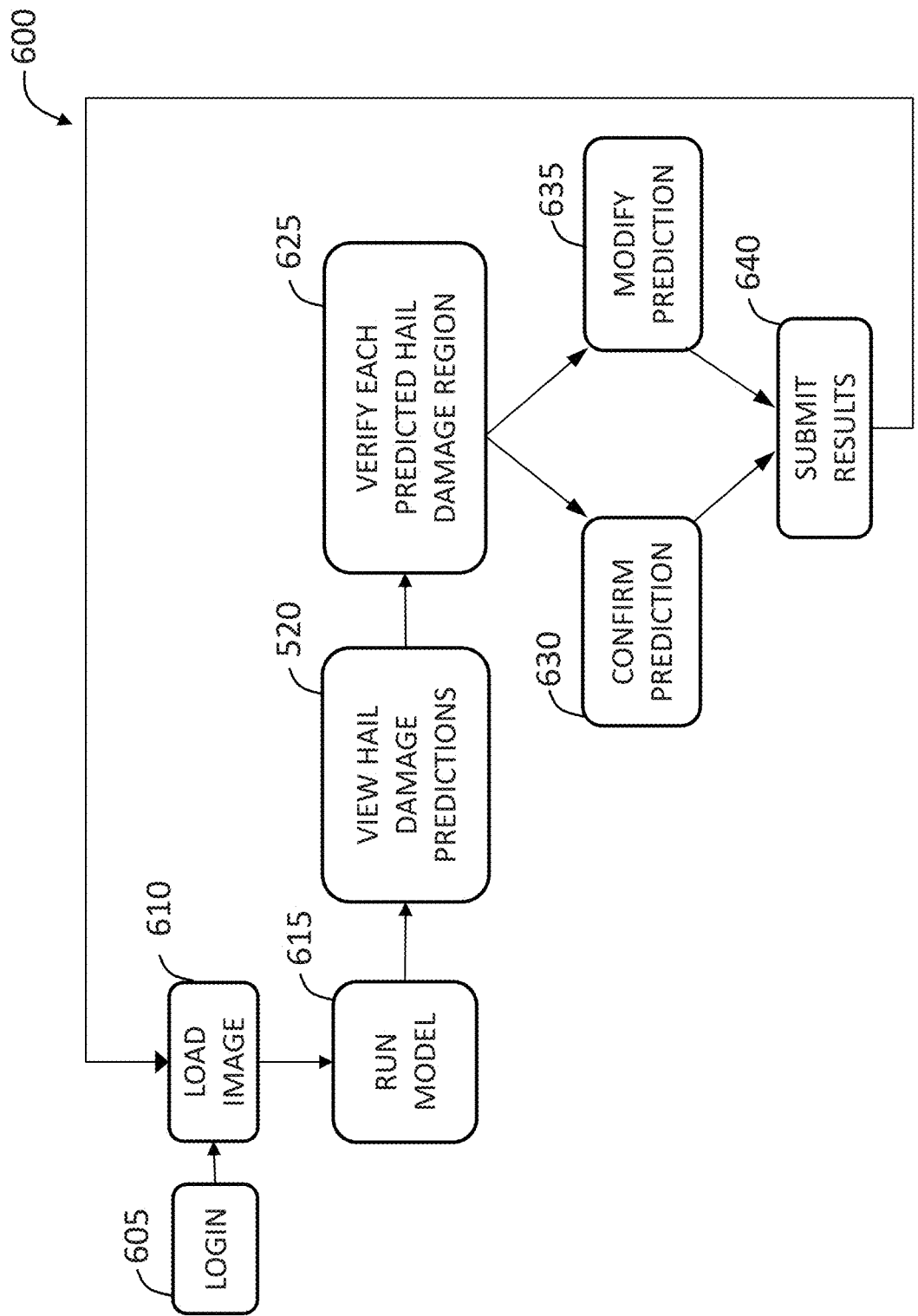
FIG. 6 illustrates a diagram of components of one or more exemplary computing devices that may be used in the IA computer system shown in FIG. 1.

FIG. 6 illustrates a flow chart of an exemplary process 600 of enabling a user, such as a data labeler to analyze images of hail damage, in accordance with the present disclosure. In the exemplary embodiment, process 600 is performed by a computing device associated with an insurance provider, such as insurer network 115 computing devices (shown in FIG. 1). In other embodiments, process 600 is performed by a computing device in communication with an insurance provider.

In the exemplary embodiment, a computing device associated with an insurance provider, such as IA server 105 (shown in FIG. 1), enables a data labeler to efficiently examine bulk image data to identify damaged regions due to hail. IA server 105 may be a back-end server that is in communication with a detachable front-end user interface, such as a client user interface. IA server 105 may also utilize an Application Programming Interface (API), such as RESTful API. In the exemplary embodiment, the user utilizes a web browser to log into the web portal provided by IA server 105.

Each user is registered (e.g., enrolled) with IA server 105 such that the user can access and analyze one or more image using the web portal. This includes providing the IA server 105 with login information (e.g., a username and a password). A user enters their login information into the web portal (step 605), which is transmitted (e.g., in the form of a user login input) directly or indirectly to IA server 105 (e.g., through the website and host). After IA server 105 authenticates the user as a registered user, the user is able to access the web portal and begin the image analysis process.

In the exemplary embodiment, the web portal displays a raw image to the user. The user may send an image request to IA server 105 to load (step 610) an image for analysis. IA server 105 distributes and assigns images for review to users intelligently, such that a high performing user will either examine more images (e.g., user gets more image data) or examine low quality images, such that the high performing user can utilize their expertise to verify damage prediction regions and correctly identify (e.g., label) actual damaged regions. IA server 105 may select a high or low quality image to be displayed to (and subsequently analyzed by) the user based upon the user's performance history (e.g., work performance). For example, if the user's performance history demonstrates that the user generally spends significant time (in comparison to others who have examined either the same image and/or an image of similar quality) examining lower quality images, IA server 105 may select a high quality image to be displayed to the user for analysis.

In addition to a user's work performance, other factors, such as a user's internet connection, preference, and/or schedule (e.g., a user in the office who has a block of time set aside to examine images as compared to a user examining one or two images while outside the office) may be taken into consideration by IA server 105 in determining which image(s) to display to the user. In the exemplary embodiment, IA server 105 continually monitors the user in real-time while the user is viewing the images on the web portal to collect user performance data and to select a subsequent image for display. In further embodiments, IA server 105 assigns the same image to a group of users to monitor and analyze each user's performance with regard to the image, and subsequently rank each user.

In one embodiment, a group of data labelers under an administrator may receive one or more test images from IA server 105. For example, data labelers may receive a low quality test image and a high quality test image. In this example, IA server 105 may collect performance data as to each test image, and apply a set of ranking rules to rank each data labeler with regard to one another. Ranking rules may be based upon different weights assigned by an administrator to a set of user performance factors such as speed, accuracy, and/or labeling consistency.

The user subsequently transmits, to IA server 105, a request to analyze damage to an object (e.g., rooftop) identified in the image. In the exemplary embodiment, rooftops are analyzed to identify damaged regions due to hail. In response to receiving the user's request for analysis, IA server 105 applies a damage prediction model to the image (step 615). In various embodiments, depending on the type of damage prediction requested, IA server 105 may select a specific model from a selection of models stored in a database and/or database server, such as database 130 and database server 125 (both shown in FIG. 1). For example, a user may request that damage prediction results be based upon a damage classification (e.g., type), such as damage due to hail, wind, mechanical artifact, and/or flood.

In some embodiments, IA server 105 may provide the user with advanced options that enable IA server 105 to not only take into consideration damage classifications, but also upon a material type of the rooftop, weather (e.g., during the day and/or time at which the damage occurred), and/or age and maintenance/repair history of the rooftop. In the exemplary embodiment, the damage prediction model is associated with a rooftop. The model implements artificial intelligence and/or machine learning algorithms, such as deep or combined learning algorithms.

The user may view (step 620) the hail damage predictions (e.g., the outputs of the model) as virtual objects (e.g., interactive boxes and/or labels) overlaid onto the original image. The user may verify (step 625) each predicted hail damaged region by selecting (e.g., clicking on) a corresponding virtual object. In the exemplary embodiment, a virtual object is overlaid at each damage prediction region on the image. When a user selects a virtual object, IA server 105 displays a magnified view of the corresponding hail damaged region (e.g., damage prediction region). In the exemplary embodiment, the magnified view (e.g., zoom in mode to view the selected damaged region) is displayed alongside a full view (e.g., zoom out mode to view all the predicted regions) of the model prediction image (e.g., displaying the original image superimposed with the prediction outputs) at a zoom-in region 955.

For each selected virtual object, the user can utilize the magnified view to either confirm (step 630) the prediction output or modify (step 635) the prediction output. If the prediction output is correct (e.g., the virtual object is correctly overlaid on a hail damaged region), the user may submit (step 640) the prediction output without any changes. If the prediction output is incorrect, the user may edit the damage prediction region of the selected virtual object prior to submitting (step 640) the modified (e.g., updated) prediction output.

The user may edit the damage prediction region by adding a virtual object at an actual damage location (e.g., an area on the image that corresponds to actual rooftop damage due to hail). For example, the user may add a bounding box, polygon, free-form contour, and/or text labels to an area on the image to correctly identify an actual damage location that was not predicted by the model.

In another example, the damage prediction region may correspond to a damaged region (e.g., actual rooftop damage exists), but the damage classification is incorrect (e.g., damage is due to heavy rain and not hail). In this example, the user may annotate the selected virtual object with comments explaining the incorrect classification.

In the example embodiment, the user is provided with a drop down menu of classification types from which the user can select the correct classification type. After reviewing and submitting the results for each damage prediction region, the user may send another image request to IA server 105 to load (step 610) another image and repeat the above-described analysis process for the new image.

Exemplary User Interfaces

Figure 7:
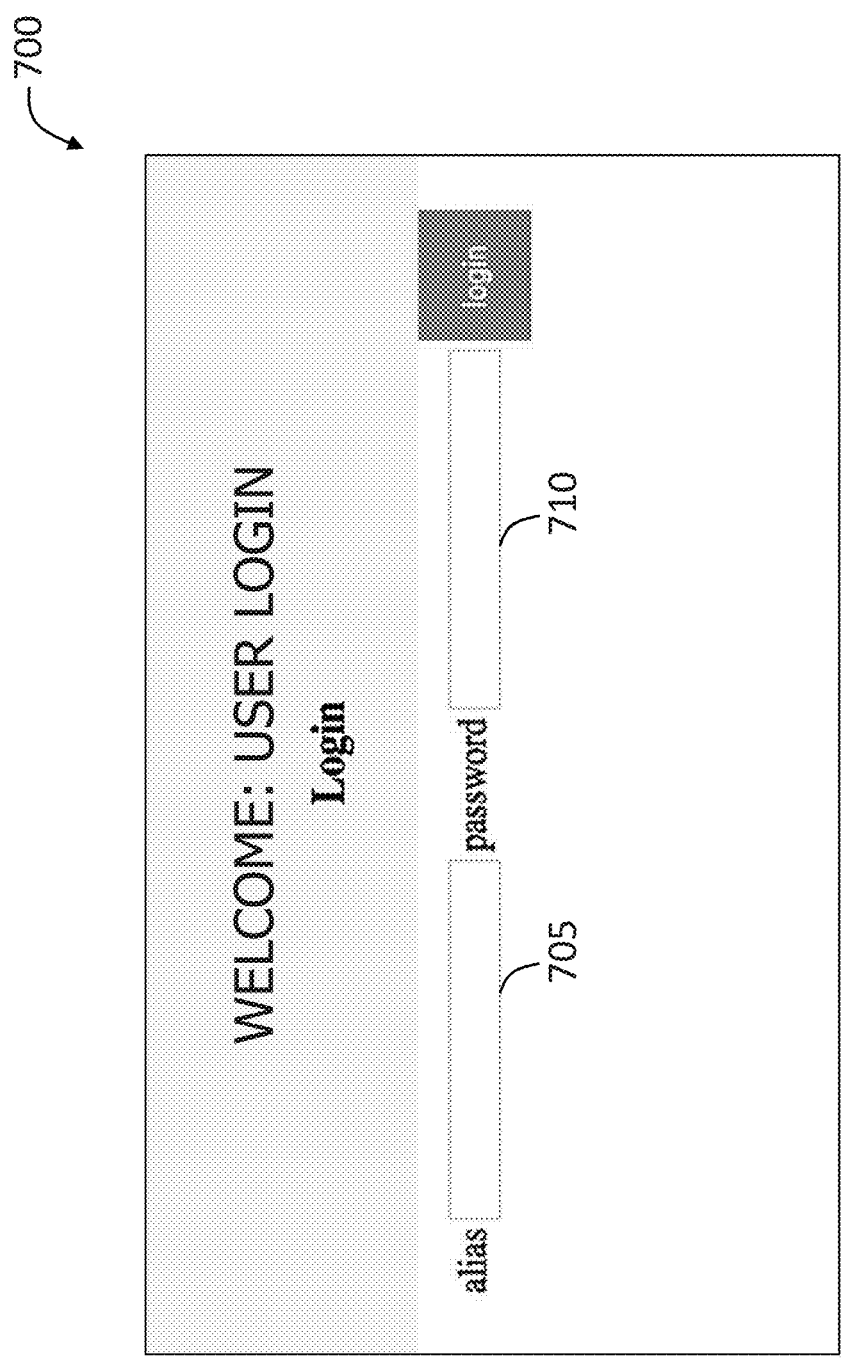
FIG. 7 illustrates an example screenshot of a login screen from the IA server for a user interface of a user computing device, in accordance with one embodiment of the present disclosure.

FIGS. 7-11 illustrate exemplary screenshots displayed on a user interface (not shown) of a user computing device (similar to user computing device 110 shown in FIG. 1) associated with a human data labeler. FIG. 7 illustrates an example user interface 700 for logging into the web portal hosted by or stored on IA server 105, as described above. User interface 700 may be hosted by IA server 105 or otherwise made accessible to a registered user, including a human data labeler, administrator, analyst, and/or client. User interface 700 prompts a user to input their username and password into inputs fields 705 and 715.

Figure 8:
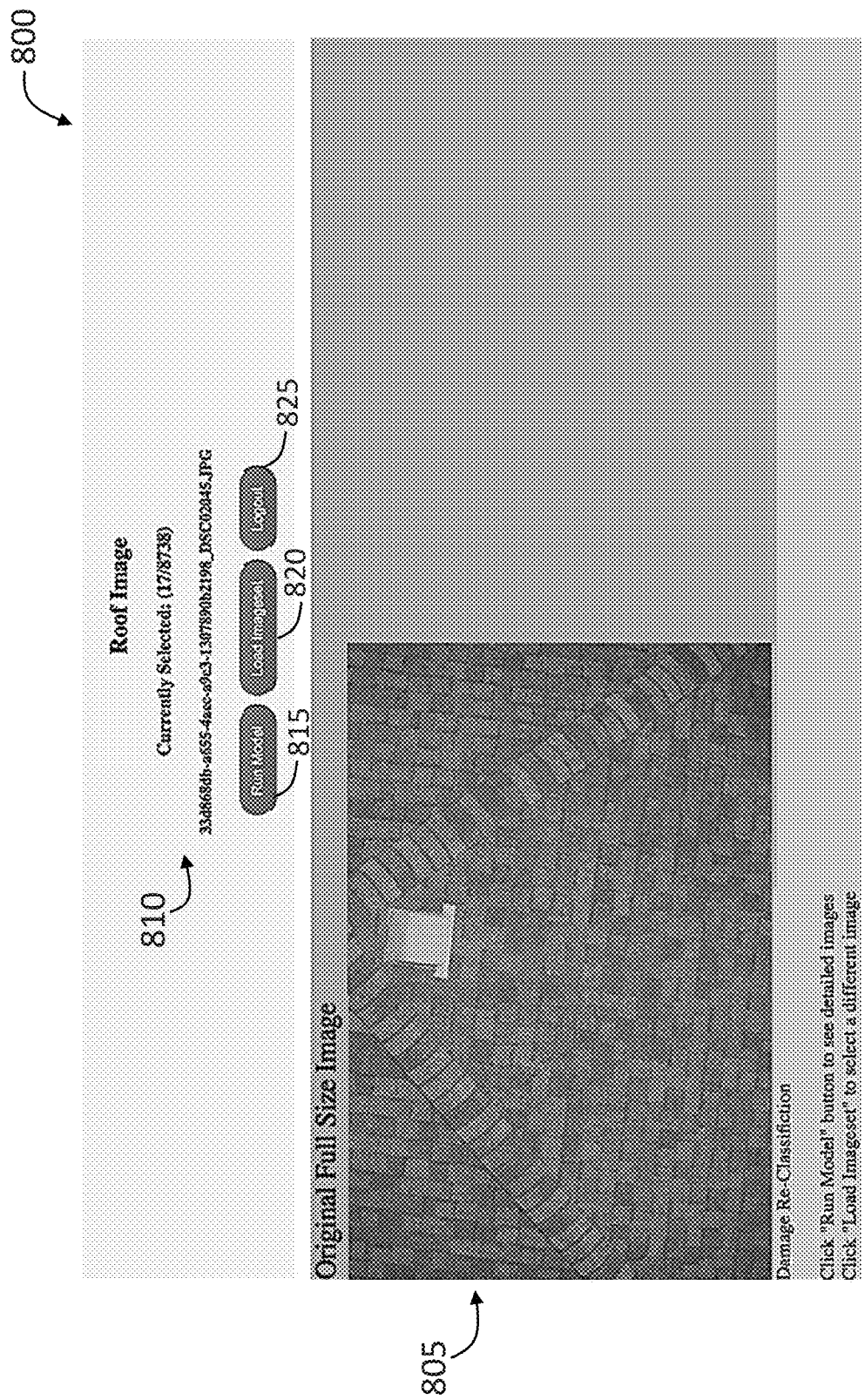
FIG. 8 illustrates an example screenshot of raw image data from the IA server for a user interface of a data labeler's user computing device, in accordance with one embodiment of the present disclosure.

FIG. 8 illustrates an example user interface 800 for viewing an image (e.g., image set) to be analyzed. User interface 800 may be hosted by IA server 105 or otherwise made accessible to a registered human data labeler. User interface 800 includes a full size image 805 of the raw (e.g., original) image to be analyzed. User interface 800 also includes image information 810 associated with the displayed image 805. User interface 800 includes an option 815 to run model (similar to model 522 shown in FIG. 5), an option 820 to load image set (e.g., display a raw image for analysis), and an option 825 to log out.

Figure 9:
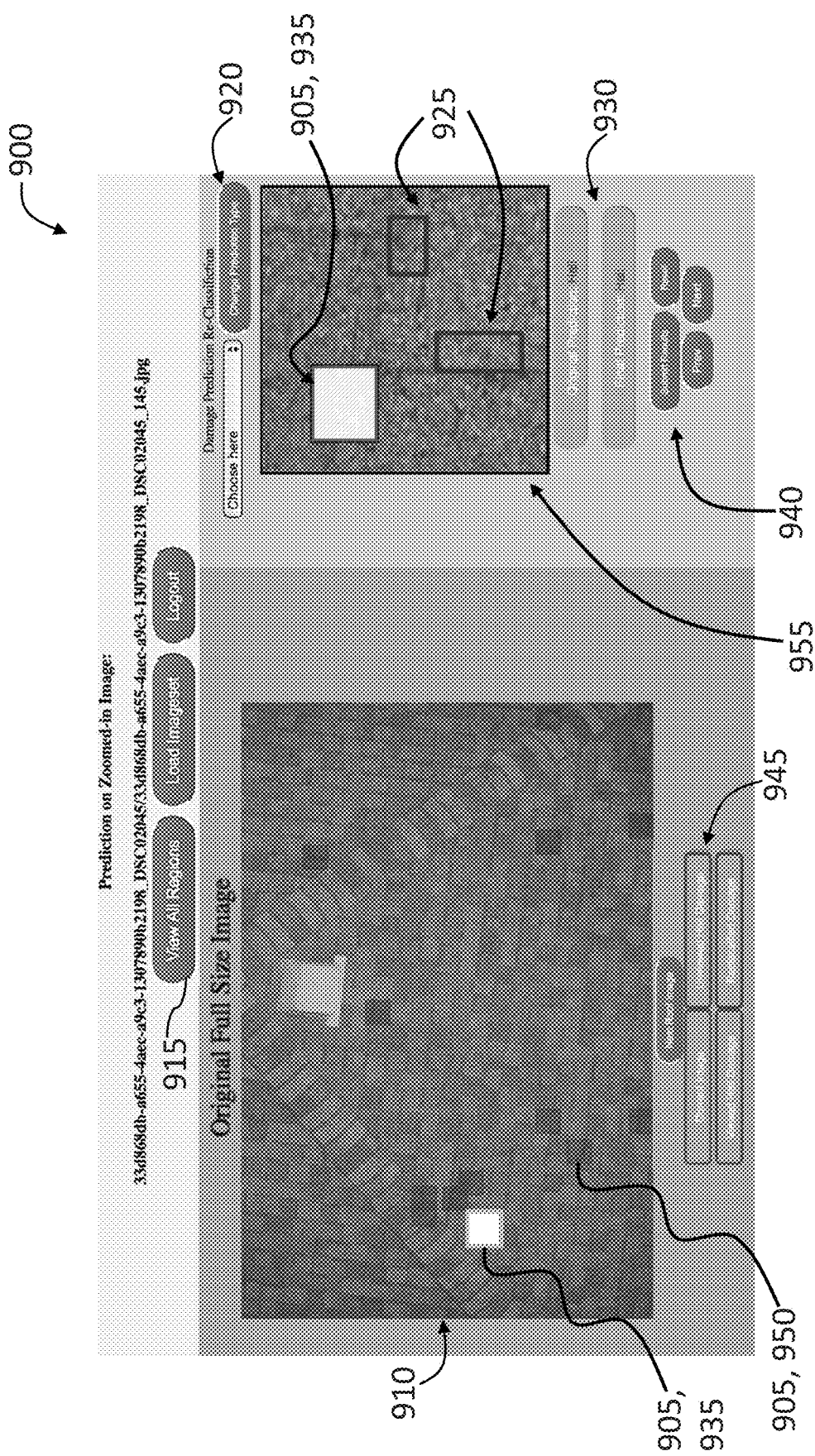
FIG. 9 illustrates an example screenshot of damage predictions on the image for a user interface of a data labeler's user computing device, in accordance with one embodiment of the present disclosure.

FIG. 9 illustrates an example user interface 900 for viewing damage prediction regions of a rooftop image, to which damage prediction model 522 has been applied. User interface 900 may be hosted by IA server 105 (shown in FIG. 1) or otherwise made accessible to a registered human data labeler. User interface 900 provides a visual representation of the predictions by displaying overlay boxes 905 at each damage prediction region. Overlay boxes 905 are interactive virtual objects that are overlaid onto image 805 (shown in FIG. 8). This display of original image 805 with overlay boxes 905 may be referred to as a model prediction image 910. User interface 900 provides an option 915 to view all regions (e.g., damage prediction regions) on model prediction image 910.

When the user selects an overlay box, such as selected overlay box 905, a magnified view of the corresponding damage prediction region is displayed alongside model prediction image 910 at zoom-in region 955. User interface 900 provides an option 920 to change the damage classification type (e.g., re-classify the damage). User interface 900 further enables the user to correct a damage prediction region by adding virtual objects 925 to actual damaged regions that were not predicted by model 522. Virtual objects 925 may be labels, annotations, and/or overlay boxes similar to overlay boxes 905. User interface 900 displays predictions 930 for selected overlay box 935 to enable the user to verify whether the original prediction (e.g., from model 522) matches the final prediction (e.g., from the user) prior to submitting the results to IA server 105. User interface 900 provides options 940 to submit results, reset the magnified view (e.g., remove virtual objects and/or annotations added by the user), display a magnified view of a previous damage prediction region, and display a magnified view of the next damage prediction region.

User interface 900 further displays a change in color of selected overlay box 935 from a first color to a second color to enable the user to track which overlay boxes 905 have been viewed. User interface 900 provides a legend 945 to enable the user to distinguish between the different colors of overlay boxes 905. For example, prior to the user interacting with overlay boxes 905, overlay boxes 905 may be of a first color (e.g., purple), representing unviewed 950 hail damage. When the user selects an overlay box, selected overlay box 935 may be of a second color (e.g., red) to represent a currently selected damage prediction region. Similarly, when a user moves on from selected overlay box 935 to a new overlay box, selected overlay box 935 can change from the second color (e.g., red) to a third color (e.g., green), which represents viewed 1005 damage prediction regions (shown in FIG. 10).

Figure 10:
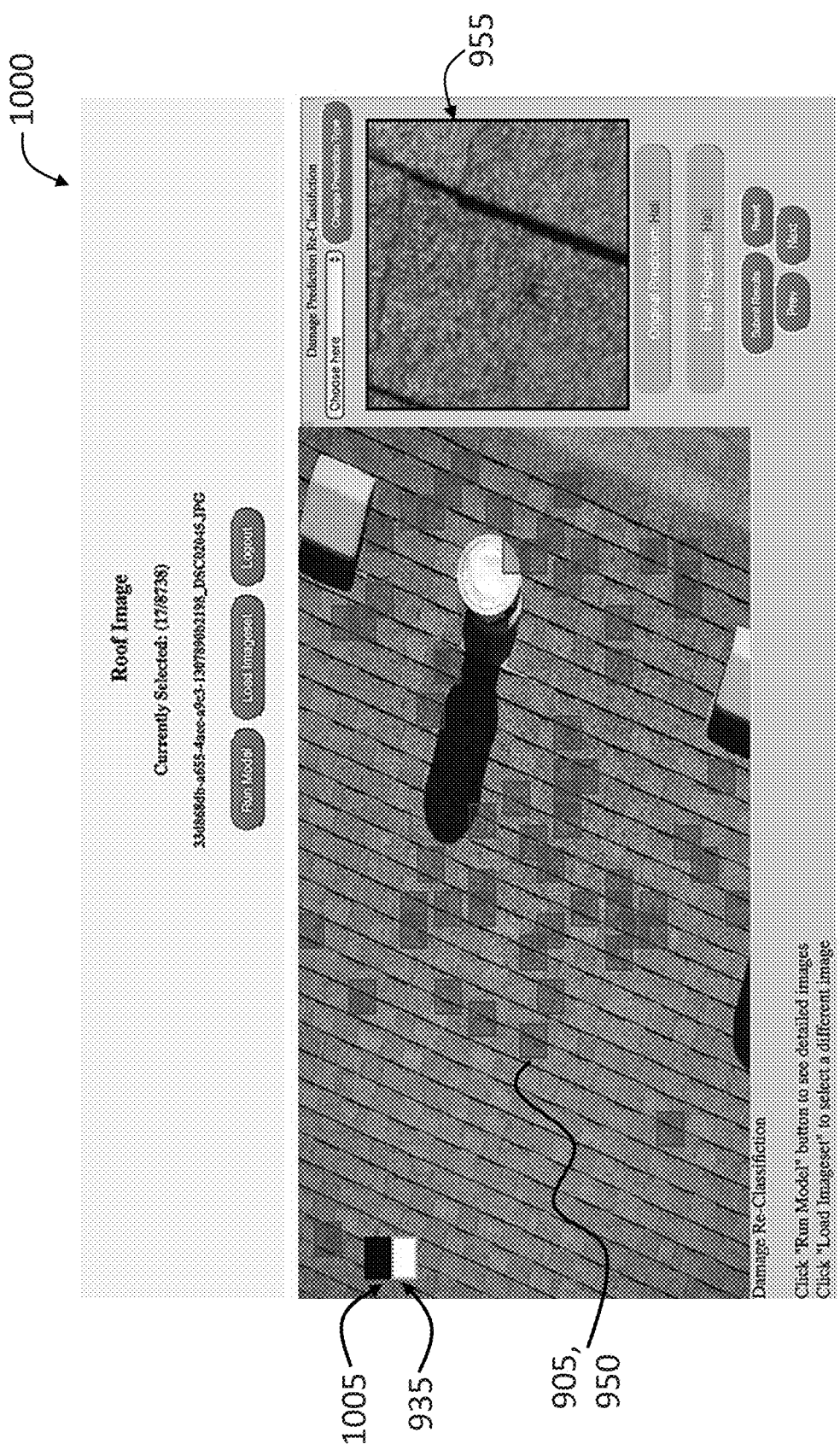
FIG. 10 illustrates another example screenshot of damage predictions on the image for a user interface of a data labeler's user computing device, in accordance with one embodiment of the present disclosure.

FIG. 10 illustrates another example user interface 1000 for viewing damage prediction regions of another rooftop image, to which damage prediction model 522 (shown in FIG. 5) has been applied. User interface 1000 may be hosted by IA server 105 (shown in FIG. 1) or otherwise made accessible to a registered human data labeler. User interface 1000 provides a visual representation of the predictions by displaying overlay boxes 905 at each damage prediction region. Overlay boxes 905 are interactive virtual objects that are overlaid onto image 805 (shown in FIG. 8). User interface 1000 displays another embodiment of zoom-in region 955 that enables a user to remove selected overlay box 935 from the magnified view. User interface 1000 provides an option (not shown) to turn selected overlay box 935 on and off while viewing the magnified view in zoom-in region 955.

Figure 11:
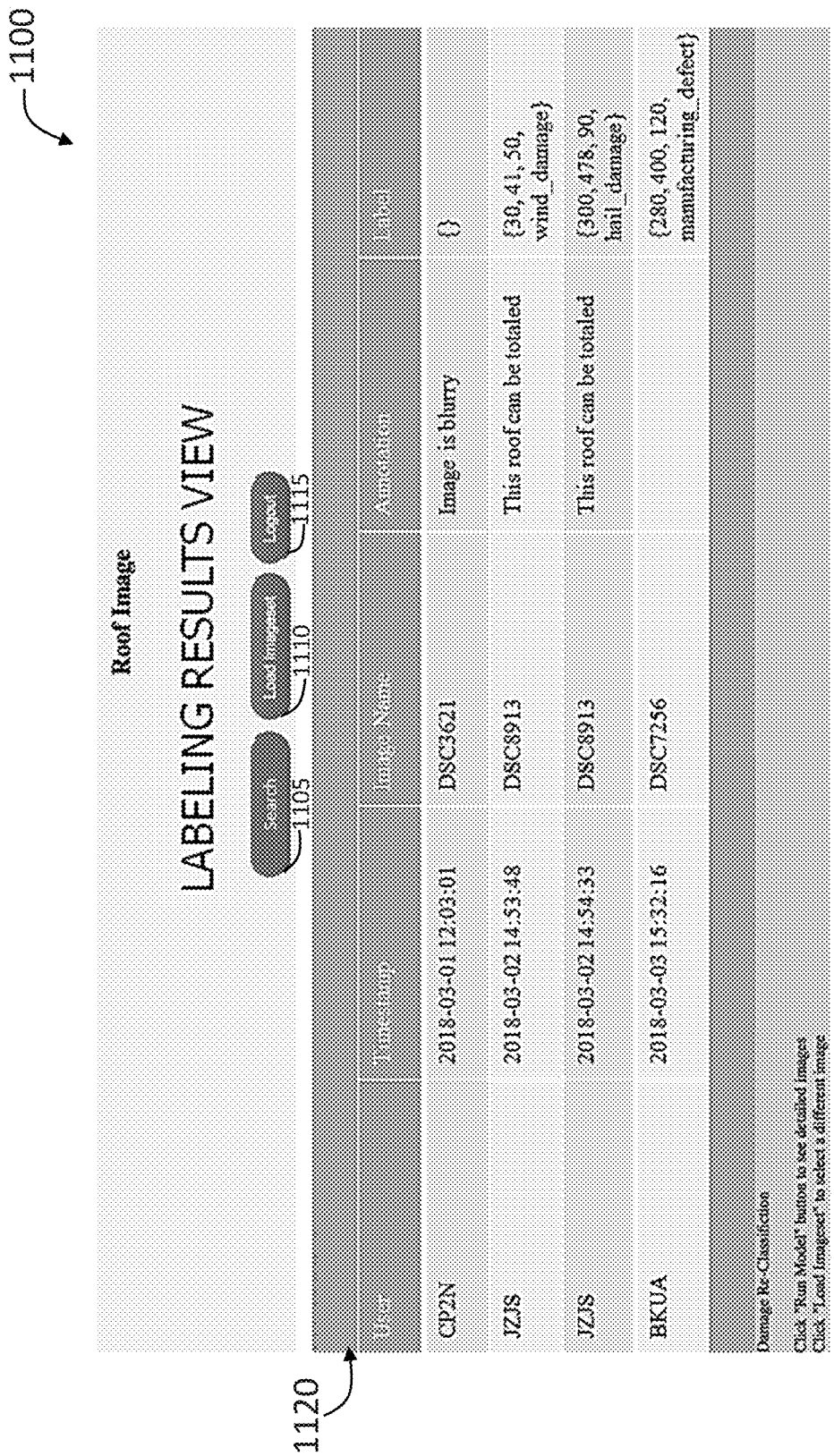
FIG. 11 illustrates an example screenshot of labeling data from the IA server for a user interface of an administrator's user computing device, in accordance with one embodiment of the present disclosure.
Figure 12:
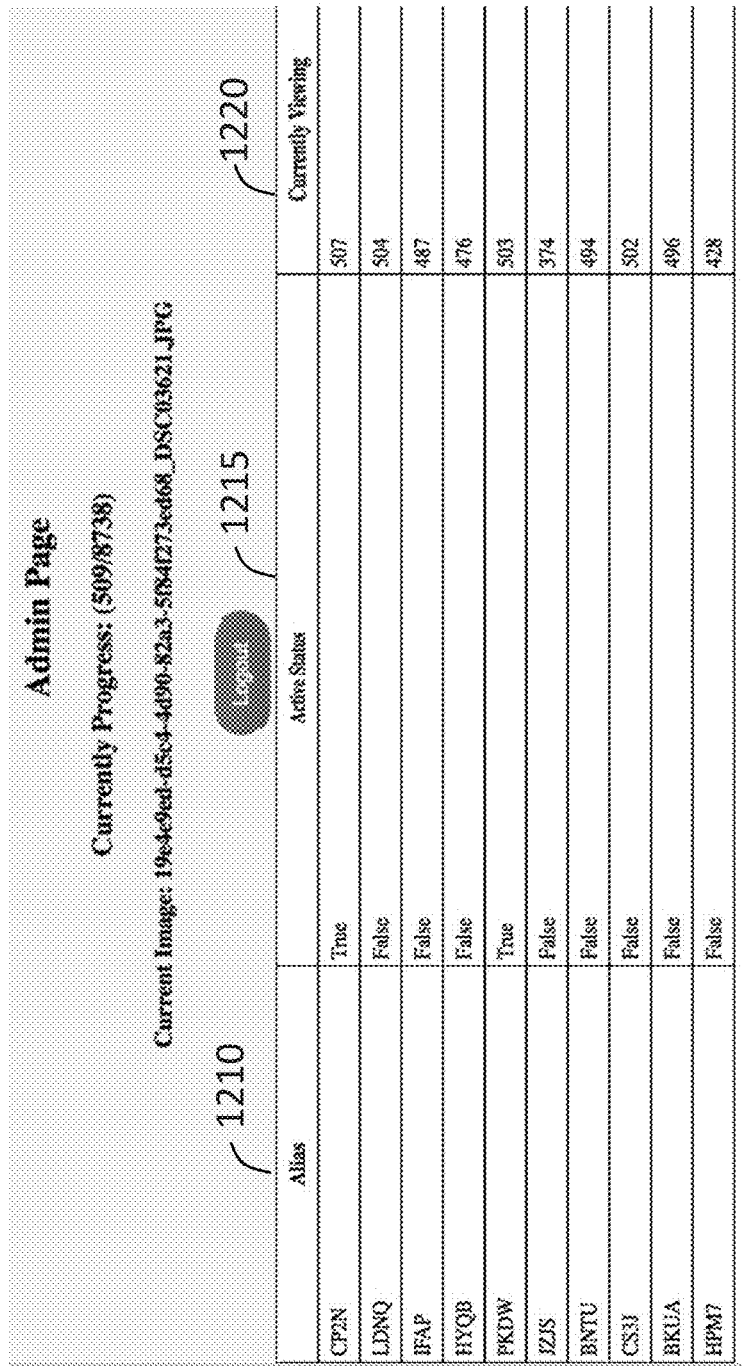
FIG. 12 illustrates an example screenshot of data labeler status information from the IA server for a user interface of an administrator's user computing device, in accordance with one embodiment of the present disclosure.

FIGS. 11 and 12 illustrate exemplary screenshots displayed on a user interface (not shown) of a user computing device (similar to user computing device 1100 shown in FIG. 1) associated with an administrator of an organization. FIG. 11 illustrates an example user interface 1100 for monitoring the labeling activity of all the data labelers for which the administrator is responsible for overseeing. More specifically, user interface 1100 provides a visual representation of the data stored in a database, such as database 130 (shown in FIG. 1).

User interface 1100 may be hosted by IA server 105 (shown in FIG. 1) or otherwise made accessible to a user, such as a registered administrator and/or client. User interface 1100 includes an option 1105 to search for a specific data labeler, image data, annotation, and/or labeling result. User interface 1100 includes an option 1110 to view an image associated with a particular labeling result. User interface 1100 further includes an option 1115 to log out.

User interface 1100 includes a table 1120 for displaying stored data associated with each data labeler. User interface 1100 displays data in table 1120, which includes columns of data categorized by data labeler (e.g., table 1120 may display a user's alias and/or identification instead of their name), timestamp associated with an examined image, image name associated with the examined image, annotation, and label. For the label column of table 1120, user interface 1100 may display the coordinates (e.g., width and height) of overlay boxes 905 and/or virtual objects 925 (both shown in FIG. 9) as well as the damage classification (e.g., wind damage, hail damage, flood damage) for the corresponding damage prediction region.

FIG. 12 illustrates an example user interface 1200 for tracking data labelers under the supervision of an administrator and/or client manager. User interface 1200 may be hosted by IA server 105 (shown in FIG. 1) or otherwise made accessible to a user, such as a registered administrator and/or client. User interface 1200 includes a table 1205 for tracking the current status of multiple data labelers. User interface 1200 displays information associated with each registered data labeler under the user's care in table 1205, which includes columns of data organized by alias 1210 (e.g., identification associated with each data labeler), active status 1215, and currently viewing 1220.

The column associated with active status 1215 provides information as to whether a specific data labeler is currently accessing IA server 105 (shown in FIG. 1), and reviewing images (e.g., currently active). If a data labeler is currently active, the row in table 1205 corresponding to the specific data labeler displays "true." If a data labeler is currently inactive, the corresponding row in table 1205 displays "false." The currently active status is relative to the day and time the user, such as an administrator, accesses user interface 1200. The column associated with currently viewing 1220 provides an image number for which a specific data labeler is currently viewing.

If a data labeler is currently inactive, the row corresponding to this column may display the image number for the image examined by the data labeler. User interface 1200 further provides information as to the current progress of the data labelers as a group (rather than on an individual basis) under the administrator's supervision.

Figure 13:
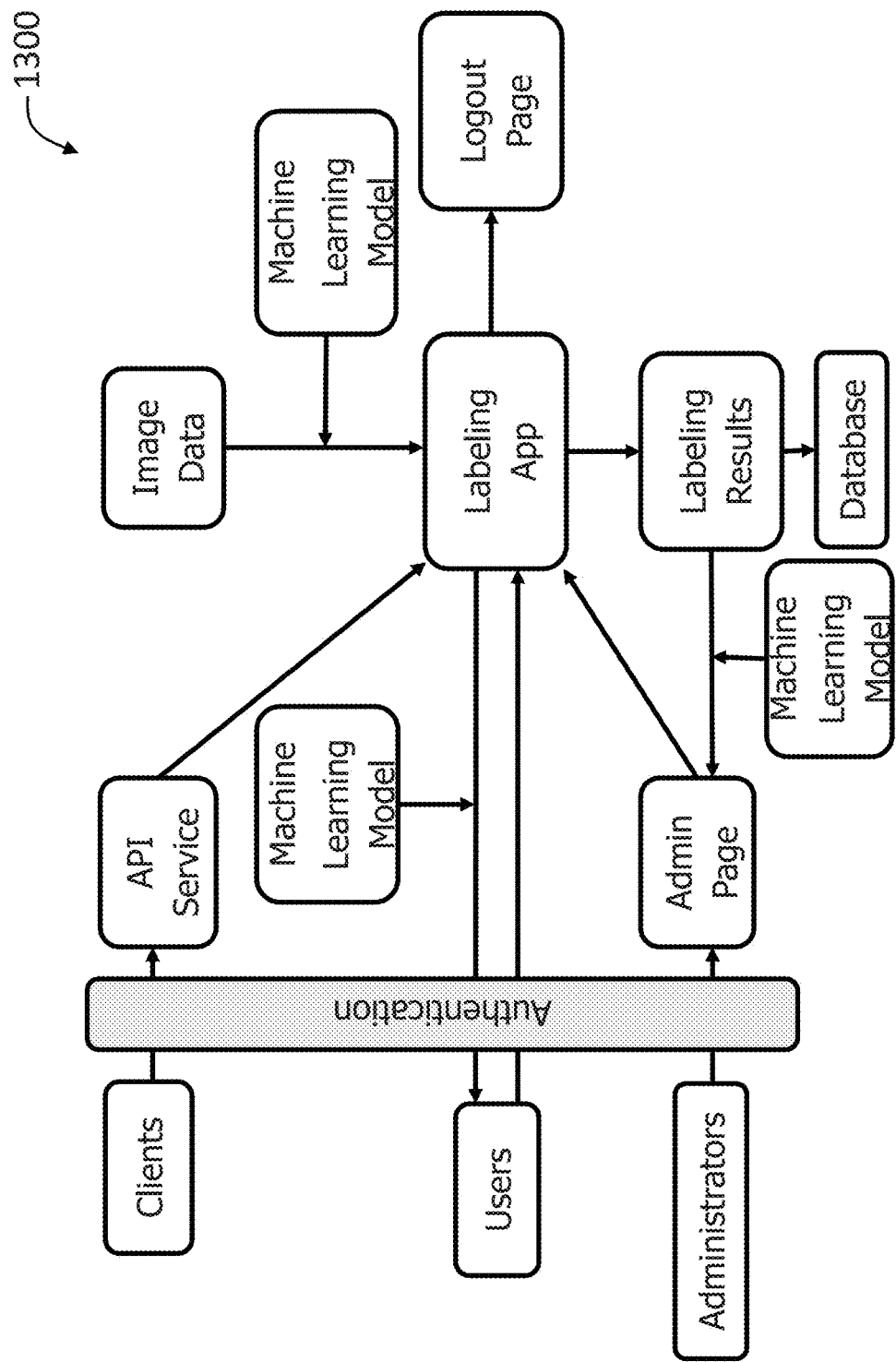
FIG. 13 illustrates an exemplary design, in accordance with one embodiment of the present disclosure.

FIG. 13 illustrates an exemplary design 1300 according to one aspect of the present disclosure. Client devices, user devices, and administrator devices may access a labeling app via an authentication layer. Machine learning models and/or algorithms, such as damage prediction models 522 (shown in FIG. 5), may be employed by IA server 105 (shown in FIG. 1) at several instances. On the right hand side of FIG. 13, a machine learning model or algorithm may distribute image data to different users using different internet connections and schedules. Additionally or alternatively, machine learning models and/or algorithms may collect and analyze performance data associated with each user to determine which type of image data should be assigned to each user. For example, IA server 105 may assign image data that requires a large amount of bandwidth to a user who has an internet speed and bandwidth capable of transmitting and processing that particular image data. In another embodiment, IA server 105 may utilize machine learning models and/or algorithms to rank a group of users based upon labeling skill and efficiency. Users with more expertise and skill may be assigned inferior quality image data prior to the image data being received by the labeling app. Then a machine learning model or algorithm may be used to display certain images on the application and present them to the users. A third machine learning model may track labeling results and track each user's performance over time, and present the results to an administrator page. Thus, by utilizing machine learning models and/or algorithms, IA server 105 is able to streamline the labeling process and enhance the quality control process by (i) enabling a greater volume and type (e.g., high-resolution and low-resolution image data) of image data to be accurately labeled, (ii) enabling users to be monitored to assess user labeling performance capabilities, and (iii) freeing up network resources and improving overall network capability by efficiently assigning image data to users based upon each user's bandwidth and data transmission capabilities.

Figure 14:
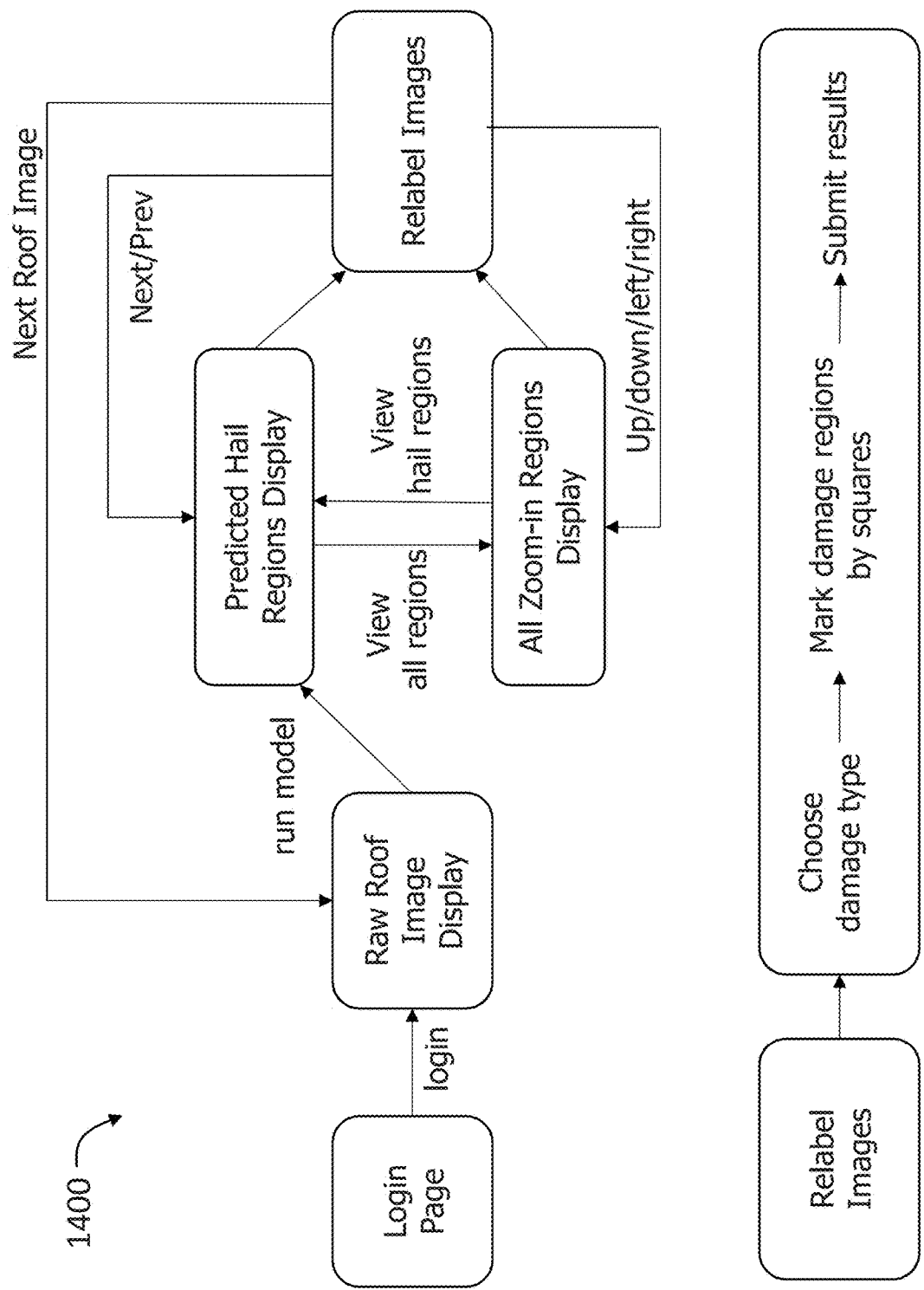
FIG. 14 illustrates an exemplary workflow, in accordance with one embodiment of the present disclosure.

FIG. 14 illustrates an exemplary workflow 1400 according to one aspect. After login, raw roof images may be displayed, and a model run that results in predicted hail regions being displayed. The images may be zoomed-in upon, and the images then relabeled. For instance, the images may be relabeled by damage type, and damage regions may be marked by squares. The results may subsequently be submitted.

EXEMPLARY EMBODIMENTS & FUNCTIONALITY

In one aspect, an image analysis ("IA") computer system for analyzing images of hail damage using artificial intelligence may be provided. The IA computing system may include at least one processor in communication with at least one memory device. The at least one processor may be configured or programmed to: (1) store, in at least one memory device, a damage prediction model associated with a rooftop, wherein the damage prediction model utilizes an artificial intelligence algorithm, including machine learning techniques for analyzing rooftops and identifying damage thereto; (2) display, to a user, an image of a rooftop, (3) receive, from the user, a request to analyze damage to the rooftop; (4) apply, by at least one processor, the image to the damage prediction model, the damage prediction model outputting a plurality of damage prediction locations of the rooftop in relation to the image; and/or (5) display, by the at least one processor, an overlay box at each of the plurality of damage prediction locations, the overlay box being a virtual object overlaid onto the image.

A further enhancement may be where the overlay box at each of the plurality of damage prediction locations changes from a first color to a second color in response to a user interaction from the user computing device, with a corresponding overlay box. A further enhancement may be where the IA computer system is also programmed to display, in response to receiving a user interaction with a selected overlay box, a magnified view of the damage prediction location associated with the selected overlay box.

A further enhancement may be where the IA computer system is also programmed to receive, from the user computing device, a user interaction verifying that a damage prediction location on the image correlates to an actual damage location. The actual damage location may represent hail damage to the rooftop. A further enhancement may be where the IA computer system is also programmed to enable the user to add one or more virtual objects onto the image. The one or more virtual objects may identify actual damage locations that represent hail damage to the rooftop.

A further enhancement may be where the IA computer system is also programmed to update a damage prediction location by (i) receiving, from the user computing device, a virtual object added to the image. The virtual object may be overlaid onto an area of the image that is different from the plurality of damage prediction locations. The IA computer system may further update the damage prediction location by (ii) determining that the area is an actual damage location associated with hail damage, and/or (ii) storing image data associated with the determination in a database of the at least one memory device. The IA computer system may further be programmed to automatically update the damage prediction model using the stored determination. The image data may include location coordinates associated with the added virtual object.

A further enhancement may be where the IA computer system is programmed to receive user feedback for the image. The user feedback may include comments as to a quality of the image, and a damage classification for each of the plurality of damage prediction locations.

A further enhancement may be where the IA computer system is further programmed to (i) assign a first color to the overlay boxes associated with the plurality of damage prediction locations; (ii) receive, from the user, a user selection of a first overlay box; (iii) update, in response to receiving the user selection, the first overlay box from the first color to a second color; and/or (iv) display the updated first overlay box at the corresponding damage prediction location.

A further enhancement may be where the IA computer system is further programmed to (i) collect performance data associated with the user; (ii) determine, based upon the collected performance data, a performance level of the user; and/or (iii) display, to the user, a subsequent rooftop image after the user completes verification of the plurality of damage prediction locations. An image quality of the subsequent rooftop image may correspond to the determined performance level. The performance data may be associated with an ability to correctly identify actual damage locations.

A further enhancement may be where the IA computer system is further programmed to apply the image to the damage prediction model by (i) storing, in the at least one memory device, historical image data associated with rooftop damage; and/or (ii) applying a plurality of damage parameters to the image. The plurality of damage parameters may be determined based upon the historical image data.

In another aspect, a computer-implemented method for analyzing images of hail damage may be provided. The method may be implemented using an image analysis ("IA") computer system. The IA computer system may include at least one processor in communication with at least one memory device. The method may include: (i) storing a damage prediction model associated with a rooftop, wherein the damage prediction model utilizes an artificial intelligence algorithm, including machine learning techniques for analyzing rooftops and identifying damage thereto; (ii) displaying, to a user, an image of a rooftop; (iii) receiving, from the user, a request to analyze damage to the rooftop; (iv) applying, by the at least one processor, the image to the damage prediction model, the damage prediction model outputting a plurality of damage prediction locations of the rooftop in relation to the image; and/or (v) displaying, by the at least one processor, an overlay box at each of the plurality of damage prediction locations, the overlay box being a virtual object overlaid onto the image.

A further enhancement may be where the overlay box at each of the plurality of damage prediction locations changes from a first color to a second color in response to a user interaction from the user computing device, with a corresponding overlay box. A further enhancement may be where the computer-implemented method includes displaying, in response to receiving a user interaction with a selected overlay box, a magnified view of the damage prediction location associated with the selected overlay box.

A further enhancement may be where the computer-implemented method includes receiving, from the user computing device, a user interaction verifying that a damage prediction location on the image correlates to an actual damage location. The actual damage location may represent hail damage to the rooftop. A further enhancement may be where the computer-implemented method includes enabling the user to add one or more virtual objects onto the image. The one or more virtual objects may identify actual damage locations that represent hail damage to the rooftop.

A further enhancement may be where the computer-implemented method includes updating a damage prediction location by (i) receiving, from the user computing device, a virtual object added to the image; (ii) determining, by the at least one processor, that the area is an actual damage location associated with hail damage; and/or (iii) storing, by the at least one processor, image data associated with the determination in a database of the at least one memory device. The virtual object may be overlaid onto an area of the image that is different from the plurality of damage prediction locations. The computer-implemented method may further include automatically updating the damage prediction model using the stored determination. The image data may include location coordinates associated with the added virtual object.

A further enhancement may be where the computer-implemented method includes receiving user feedback for the image. The user feedback may include comments as to a quality of the image and a damage classification for each of the plurality of damage prediction locations.

A further enhancement may be where the computer-implemented method includes (i) assigning, by the at least one processor, a first color to the overlay boxes associated with the plurality of damage prediction locations; (ii) receiving, from the user, a user selection of a first overlay box; (iii) updating, in response to receiving the user selection, the first overlay box from the first color to a second color; and/or (iv) displaying, by the at least one processor, the updated first overlay box at the corresponding damage prediction location.

A further enhancement may be where the computer-implemented method also includes (i) collecting performance data associated with the user; (ii) determining, based upon the collected performance data, a performance level of the user; and/or (iii) displaying, to the user, a subsequent rooftop image after the user completes verification of the plurality of damage prediction locations. The image quality of the subsequent rooftop image may correspond to the determined performance level. The performance data may be associated with an ability to correctly identify actual damage locations.

A further enhancement may be where the computer-implemented method also includes (i) storing historical image data associated with rooftop damage, and (ii) applying a plurality of damage parameters to the image. The plurality of damage parameters may be determined, by the at least one processor, based upon the historical image data.

In yet another embodiment, at least one non-transitory computer-readable storage media having computer-executable instructions embodied thereon may be provided. When executed by at least one processor, the computer-executable instructions may cause the at least one processor to: (i) store a damage prediction model associated with a rooftop, wherein the damage prediction model utilizes an artificial intelligence algorithm, including machine learning techniques for analyzing rooftops and identifying damage thereto; (ii) display, to a user, an image of a rooftop; (iii) receive, from the user, a request to analyze damage to the rooftop; (iv) apply, by the at least one processor, the image to the damage prediction model, the damage prediction model outputting a plurality of damage prediction locations of the rooftop in relation to the image; and/or (v) display, by the at least one processor, an overlay box at each of the plurality of damage prediction locations, the overlay box being a virtual object overlaid onto the image.

A further enhancement may be where the overlay box at each of the plurality of damage prediction locations changes from a first color to a second color in response to a user interaction from the user computing device, with a corresponding overlay box. A further enhancement may be where the computer-executable instructions further cause the at least one processor to display, in response to receiving a user interaction with a selected overlay box, a magnified view of the damage prediction location associated with the selected overlay box.

A further enhancement may be where the computer-executable instructions further cause the at least one processor to receive, from the user computing device, a user interaction verifying that a damage prediction location on the image correlates to an actual damage location. The actual damage location may represent hail damage to the rooftop. A further enhancement may be where the computer-executable instructions further cause the at least one processor to enable the user to add one or more virtual objects onto the image. The one or more virtual objects may identify actual damage locations that represent hail damage to the rooftop.

A further enhancement may be where the computer-executable instructions further cause the at least one processor to update a damage prediction location by (i) receiving, from the user computing device, a virtual object added to the image; (ii) determining that the area is an actual damage location associated with hail damage; and/or (iii) storing image data associated with the determination in a database. The virtual object may be overlaid onto an area of the image that is different from the plurality of damage prediction locations. The computer-executable instructions may further cause the at least one processor to automatically update the damage prediction model using the stored determination. The image data may include location coordinates associated with the added virtual object.

A further enhancement may be where the computer-executable instructions further cause the at least one processor to receive user feedback for the image. The user feedback may include comments as to a quality of the image, and a damage classification for each of the plurality of damage prediction locations.

A further enhancement may be where the computer-executable instructions further cause the at least one processor to (i) assign a first color to the overlay boxes associated with the plurality of damage prediction locations; (ii) receive, from the user, a user selection of a first overlay box; (iii) update, in response to receiving the user selection, the first overlay box from the first color to a second color; and/or (iv) display the updated first overlay box at the corresponding damage prediction location.

A further enhancement may be where the computer-executable instructions further cause the at least one processor to (i) collect performance data associated with the user; (ii) determine, based upon the collected performance data, a performance level of the user; and/or (iii) display, to the user, a subsequent rooftop image after the user completes verification of the plurality of damage prediction locations. An image quality of the subsequent rooftop image may correspond to the determined performance level. The performance data may be associated with an ability to correctly identify actual damage locations.

A further enhancement may be where the computer-executable instructions further cause the at least one processor to apply the image to the damage prediction model by (i) storing historical image data associated with rooftop damage; and/or (ii) applying a plurality of damage parameters to the image. The plurality of damage parameters may be determined based upon the historical image data.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample (e.g., training) data sets or certain data into the programs, such as image data of objects to be analyzed (e.g., rooftops), intelligent home telematics data, mobile device data, and/or vehicle telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning, such as deep learning, reinforced learning, or combined learning. In the exemplary embodiment, updated or labeled image data (e.g., data corresponding to damage prediction locations that have been reviewed by a human data labeler) feeds back into the machine learning programs in real-time to update its set of parameters.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. The unsupervised machine learning techniques may include clustering techniques, cluster analysis, anomaly detection techniques, multivariate data analysis, probability techniques, unsupervised quantum learning techniques, associate mining or associate rule mining techniques, and/or the use of neural networks. In some embodiments, semi-supervised learning techniques may be employed. In the exemplary embodiment, machine learning techniques are used to predict damaged regions on an object identified in an image, and to output the predictions as interactive virtual objects (e.g., overlay boxes, labels) that are overlaid onto the image.

In the exemplary embodiment, a processing element may be trained by providing it with a large sample of rooftop image data with known characteristics or features. Such information may include, for example, information associated with a shape, size, and/or depth of a plurality of impact craters (e.g., damaged regions) due to a hail storm and information as to the spacing and/or distance between each impact crater.

Based upon these analyses, the processing element may learn how to identify characteristics and patterns that may then be applied to analyzing rooftop image data. For example, the processing element may learn to predict hail damaged regions on a rooftop by recognizing a random distribution or randomly spaced distribution of impact craters over a surface of the rooftop. Similarly, the processing element may also learn to identify hail damaged regions by recognizing fluctuations in the sizes, shapes, and depths of the impact craters created (and/or include impact crater size anomalies) as each unique hailstone impacts a particular rooftop. Additionally or alternatively, the processing element may learn to differentiate damaged regions (e.g., impact craters) due to hailstone impacts from those due to mechanical artifacts. For example, the processing element may detect that some (or all) of the damage locations on a rooftop are dimensionally similar and/or substantially uniformly or equally spaced, and as a result, predict that the damage locations are not a result of hail damage.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An image analysis ("IA") computer system for analyzing images of hail damage using artificial intelligence, the IA computer system including at least one processor in communication with at least one memory device, the at least one processor programmed to:
   store, in the at least one memory device, a damage prediction model associated with a rooftop, wherein the damage prediction model utilizes an artificial intelligence algorithm, including machine learning techniques for analyzing rooftops and identifying damage thereto;
   display, to a user on a user interface of a user computing device, an image of a rooftop;
   receive, from the user via the user interface of the user computing device, a request to analyze damage to the rooftop displayed in the image;
   in response to the request, apply, by the at least one processor, the image to the damage prediction model, the damage prediction model outputting a plurality of damage prediction locations of the rooftop in relation to the image;
   display, by the at least one processor, on the user interface of the user computing device, an overlay box at each of the plurality of damage prediction locations, the overlay box being a virtual object overlaid onto the image displayed on the user interface;
   receive, from the user computing device, a user selection of a location on the image displayed on the user interface;
   when the user-selected location corresponds to one overlay box at one of the plurality of damage prediction locations:
      display additional information associated with the corresponding damage prediction location; and
      receive, from the user computing device, a user interaction verifying whether the corresponding damage prediction location correlates to an actual damage location; and
   when the user-selected location does not correspond to any overlay box:
      add, in response to the user selection of the location, a new overlay box including a new virtual overlay at the user-selected location; and
      determine whether the new overlay box correlates to an actual damage location.

2. The IA computer system of claim 1, wherein the at least one processor is further programmed to, when the user-selected location corresponds to one overlay box at one of the plurality of damage prediction locations, change a color of the corresponding overlay box from a first color to a second color in response to the user interaction.

3. The IA computer system of claim 1, wherein the at least one processor is further programmed to, when the location corresponds to one overlay box at one of the plurality of damage prediction locations, display a magnified view of the damage prediction location associated with the corresponding overlay box.

4. The IA computer system of claim 1, wherein actual damage locations represent hail damage to the rooftop displayed in the image.

5. The IA computer system of claim 1, wherein the at least one processor is further programmed to:
   automatically determine, by the at least one processor, that the new overlay box corresponds to an actual damage location associated with hail damage; and
   store, by the at least one processor, image data associated with the determination in a database of the at least one memory device.

6. The IA computer system of claim 5, wherein the at least one processor is further programmed to automatically update the damage prediction model using the stored determination.

7. The IA computer system of claim 5, wherein the image data includes location coordinates for the actual damage location defined by the new virtual object.

8. The IA computer system of claim 1, wherein the at least one processor is further programmed to receive user feedback for the image, wherein the user feedback includes comments as to a quality of the image and a damage classification for each of the plurality of damage prediction locations.

9. The IA computer system of claim 1, wherein the at least one processor is further programmed to:
   assign, by the at least one processor, a first color to the overlay boxes associated with the plurality of damage prediction locations;
   when the user-selected location corresponds to one overlay box at one of the plurality of damage prediction locations, update, in response to receiving the user selection, the corresponding overlay box from the first color to a second color; and
   display, by the at least one processor, the updated overlay box at the corresponding damage prediction location.

10. The IA computer system of claim 1, wherein the at least one processor is further programmed to:
   collect performance data associated with the user, wherein the performance data is associated with an ability to correctly identify actual damage locations;
   determine, based upon the collected performance data, a performance level of the user; and
   display, to the user, a subsequent rooftop image after the user completes verification of the plurality of damage prediction locations, wherein an image quality of the subsequent rooftop image corresponds to the determined performance level.

11. The IA computer system of claim 1, wherein the at least one processor is programmed to apply the image to the damage prediction model by:
   storing, in the at least one memory device, historical image data associated with rooftop damage; and
   applying a plurality of damage parameters to the image, wherein the plurality of damage parameters are determined, by the at least one processor, based upon the historical image data.

12. A computer-implemented method for analyzing images of hail damage using artificial intelligence, the method implemented using an image analysis ("IA") computer system, the IA computer system including at least one processor in communication with at least one memory device, the method comprising:
   storing, in the at least one memory device, a damage prediction model associated with a rooftop, wherein the damage prediction model utilizes an artificial intelligence algorithm, including machine learning techniques for analyzing rooftops and identifying damage thereto;
   displaying, to a user on a user interface of a user computing device, an image of a rooftop;
   receiving, from the user via the user interface of the user computing device, a request to analyze damage to the rooftop displayed in the image;

in response to the request, applying, by the at least one processor, the image to the damage prediction model, the damage prediction model outputting a plurality of damage prediction locations of the rooftop in relation to the image;

displaying, by the at least one processor, on the user interface of the user computing device, an overlay box at each of the plurality of damage prediction locations, the overlay box being a virtual object overlaid onto the image displayed on the user interface;

receiving, from the user computing device, a user selection of a location on the image displayed on the user interface;

when the user-selected location corresponds to one overlay box at one of the plurality of damage prediction locations:
  displaying additional information associated with the corresponding damage prediction location; and
  receiving, from the user computing device, a user interaction verifying whether the corresponding damage prediction location correlates to an actual damage location; and when the user-selected location does not correspond to any overlay box:
  adding, in response to the user selection of the location, a new overlay box including a new virtual overlay at the user-selected location; and determining whether the new overlay box correlates to an actual damage location.

13. The IA computer-implemented method of claim 12, further comprising, when the user-selected location corresponds to one overlay box at one of the plurality of damage prediction locations, changing a color of the corresponding overlay box from a first color to a second color in response to the user interaction.

14. The IA computer-implemented method of claim 12, further comprising, when the user-selected location corresponds to one overlay box at one of the plurality of damage prediction locations, displaying a magnified view of the damage prediction location associated with the selected corresponding overlay box.

15. The IA computer-implemented method of claim 12, wherein the actual damage location represent hail damage to the rooftop displayed in the image.

16. The IA computer-implemented method of claim 12, further comprising:
  automatically determining, by the at least one processor, that the new overlay box corresponds to an actual damage location associated with hail damage; and
  storing, by the at least one processor, image data associated with the determination in a database of the at least one memory device.

17. The IA computer-implemented method of claim 16, further comprising automatically updating the damage prediction model using the stored determination.

18. At least one non-transitory computer-readable storage media having computer-executable instructions embodied thereon, wherein when executed by at least one processor, the computer-executable instructions cause the at least one processor to:

store a damage prediction model associated with a rooftop, wherein the damage prediction model utilizes an artificial intelligence algorithm, including machine learning techniques for analyzing rooftops and identifying damage thereto;

display, to a user on a user interface of a user computing device, an image of a rooftop;

receive, from the user via the user interface of the user computing device, a request to analyze damage to the rooftop displayed in the image;

in response to the request, apply, by the at least one processor, the image to the damage prediction model, the damage prediction model outputting a plurality of damage prediction locations of the rooftop in relation to the image;

display, by the at least one processor, on the user interface of the user computing device, an overlay box at each of the plurality of damage prediction locations, the overlay box being a virtual object overlaid onto the image displayed on the user interface;

receive, from the user computing device, a user selection of a location on the image displayed on the user interface;

when the user-selected location corresponds to one overlay box at one of the plurality of damage prediction locations:
  display additional information associated with the corresponding damage prediction location; and
  receive, from the user computing device, a user interaction verifying whether the corresponding damage prediction location correlates to an actual damage location; and when the user-selected location does not correspond to any overlay box:
  add, in response to the user selection of the location, a new overlay box including a new virtual overlay at the user-selected location; and
  determine whether the new overlay box correlates to an actual damage location.

19. The IA computer system of claim 1, wherein the at least one processor is further configured to:
  determine the new overlay box correlates to an actual damage location by receiving user confirmation, via the user interface on the user computing device, that the new overlay box correlates to an actual damage location; and
  store image data associated with the determination in a database of the at least one memory device.

20. The IA computer-implemented method of claim 12, further comprising:
  determining the new overlay box correlates to an actual damage location by receiving user confirmation, via the user interface on the user computing device, that the new overlay box correlates to an actual damage location; and
  storing image data associated with the determination in a database of the at least one memory device.

* * * * *